United States Patent
Ohtsuji et al.

(10) Patent No.: US 10,524,235 B2
(45) Date of Patent: Dec. 31, 2019

(54) NETWORK APPARATUS, RADIO TERMINAL, AND METHOD THEREFOR

(71) Applicant: NEC CORPORATION, Tokyo (JP)

(72) Inventors: Taichi Ohtsuji, Tokyo (JP); Hiroaki Aminaka, Tokyo (JP); Kazushi Muraoka, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/072,205

(22) PCT Filed: Dec. 15, 2016

(86) PCT No.: PCT/JP2016/087337
§ 371 (c)(1),
(2) Date: Jul. 24, 2018

(87) PCT Pub. No.: WO2017/130592
PCT Pub. Date: Aug. 3, 2017

(65) Prior Publication Data
US 2019/0029029 A1    Jan. 24, 2019

(30) Foreign Application Priority Data

Jan. 25, 2016 (JP) ................................ 2016-011685

(51) Int. Cl.
*H04W 72/04* (2009.01)
*H04W 76/27* (2018.01)
(Continued)

(52) U.S. Cl.
CPC ........... *H04W 72/0406* (2013.01); *H04L 5/00* (2013.01); *H04W 4/023* (2013.01);
(Continued)

(58) Field of Classification Search
CPC ... H04W 72/121; H04W 76/27; H04W 92/18; H04W 88/04; H04W 72/0406; H04W 72/0446; H04W 72/12; H04W 72/04
See application file for complete search history.

(56) References Cited

U.S. PATENT DOCUMENTS

2016/0095112 A1*  3/2016  Panteleev ............. H04W 76/14
                                                              370/329
2016/0353477 A1* 12/2016  Wang ................ H04W 72/1278
                              (Continued)

FOREIGN PATENT DOCUMENTS

JP         2015-231097 A       12/2015

OTHER PUBLICATIONS

"3rd Generation Partnership Project; Technical Specification Group Services and System Aspects; Proximity-based services (ProSe) Stage 2 (Release 12)"; Dec. 2015; pp. 1-58; 3GPP TS 23.303 V12.7.0; Valbonne, France.

(Continued)

*Primary Examiner* — Chi Ho A Lee
*Assistant Examiner* — Andrew Lee
(74) *Attorney, Agent, or Firm* — Sughrue Mion, PLLC

(57) ABSTRACT

A network apparatus (2) transmits, to at least one of a D2D transmitting terminal (1A) and a D2D reception terminal (1B), a first control signal (501) including an indication indicating which of first and second D2D transmission modes is activated. The first D2D transmission mode conforms to a first resource pattern that is repeated every first time period. The second D2D transmission mode conforms to a second resource pattern that is repeated every second time period, the second time period being the same as or different from the first time period. The second resource pattern is defined so as to allow low-latency transmission. In an example, the second resource pattern does not include a (Continued)

control channel subframe pool that is used for transmission of D2D control information indicating resource allocation for data transmission.

20 Claims, 17 Drawing Sheets

(51) Int. Cl.
*H04L 5/00* (2006.01)
*H04W 4/02* (2018.01)
*H04W 92/18* (2009.01)
*H04W 88/04* (2009.01)

(52) U.S. Cl.
CPC ......... *H04W 72/042* (2013.01); *H04W 76/27* (2018.02); *H04L 5/0048* (2013.01); *H04L 5/0053* (2013.01); *H04W 88/04* (2013.01); *H04W 92/18* (2013.01)

(56) References Cited

U.S. PATENT DOCUMENTS

| | | | |
|---|---|---|---|
| 2016/0353478 A1* | 12/2016 | Kim | H04W 72/12 |
| 2017/0079085 A1* | 3/2017 | Yang | H04W 72/02 |
| 2017/0118621 A1* | 4/2017 | Sorrentino | H04W 76/14 |
| 2017/0150501 A1* | 5/2017 | Park | H04L 1/1861 |
| 2017/0310415 A1* | 10/2017 | Thangarasa | H04W 72/12 |
| 2017/0325243 A1* | 11/2017 | Yasukawa | H04W 48/08 |
| 2018/0213379 A1* | 7/2018 | Xiong | H04W 4/70 |
| 2018/0227943 A1* | 8/2018 | Xiao | H04W 16/14 |
| 2018/0317221 A1* | 11/2018 | Yasukawa | H04W 4/04 |
| 2018/0324823 A1* | 11/2018 | Martin | H04W 72/042 |

OTHER PUBLICATIONS

"3rd Generation Partnership Project; Technical Specification Group Radio Access Network; Evolved Universal Terrestrial Radio Access (E-UTRA) Physical Layer procedures (Release 12)"; Mar. 2015; pp. 1-239; 3GPP TS 36.213 V12.5.0.

"Consideration on design for eNB scheduling PC5 V2V"; Nov. 15-22, 2015; pp. 1-4; 3GPP TSG-RAN WG1 Meeting #83, R1-156608, CATT, Anaheim, USA.

"Resource pool allocation enhancement for V2V"; Nov. 15-22, 2015; pp. 1-6;, 3GPP TSG-RAN WG1 Meeting #83 R1-156658; ZTE, Anaheim, USA.

"Discussion on enhancement for PC5 based V2V resource allocation"; Nov. 15-22, 2015, pp. 1-18; 3GPP TSG-RAN WG1 Meeting #83 R1-157435; LG Electronics, Anaheim, USA.

"Enhancement to resource pool structure of PC5-based V2V"; Feb. 15-19, 2016; pp. 1-4; 3GPP TSG-RAN WG1 Meeting #84 R1-160394; St. Julian's,Malta.

International Search report of PCT/JP2016/087337 filed Feb. 21, 2017.

* cited by examiner

NETWORK APPARATUS, RADIO TERMINAL, AND METHOD THEREFOR

This application is a National Stage of International Application No. PCT/JP2016/087337 filed Dec. 15, 2016, claiming priority based on the Japanese Patent Application No. 2016-011685 filed Jan. 25, 2016, the disclosure of which is incorporated herein in its entirety by reference.

TECHNICAL FIELD

The present disclosure relates to inter-terminal direct communication (device-to-device (D2D) communication) and, in particular, to allocation of radio resources for D2D communication.

BACKGROUND ART

A type of communication in which e a wireless terminal directly communicates with another wireless terminal without going through an infrastructure network such as a base station is referred to as device-to-device (D2D) communication. The D2D communication includes at least one of Direct Communication and Direct Discovery. In some implementations, a plurality of wireless terminals supporting D2D communication form a D2D communication group autonomously or under the control of a network, and communicate with another wireless terminal in the formed D2D communication group.

Proximity-based services (ProSe) specified in 3GPP Release 12 is one example of the D2D communication (see, for example, Non Patent Literature 1). ProSe Direct Discovery is performed through a procedure in which a wireless terminal capable of performing ProSe (i.e., ProSe-enabled User Equipment (UE)) discovers another ProSe-enabled UE only by using the capability of a radio communication technology (e.g., Evolved Universal Terrestrial Radio Access (E-UTRA) technology) of those two UEs. ProSe Direct Discovery may be performed by three or more ProSe-enabled UEs.

ProSe Direct Communication makes it possible to establish a communication path(s) between two or more ProSe-enabled UEs existing in a direct communication range after the ProSe Direct Discovery procedure is performed. Stated differently, ProSe Direct Communication enables a ProSe-enabled UE to directly communicate with another ProSe-enabled UE without going through a Public Land Mobile Network (PLMN)) including a base station (eNodeB (eNB)). ProSe Direct Communication may be performed by using a radio communication technology (i.e., E-UTRA technology) that is also used to access a base station (eNB) or by using a Wireless Local Area Network (WLAN) radio technology (i.e., IEEE 802.11 radio technology).

In 3GPP Release 12, a radio link between wireless terminals used for Direct Communication or Direct Discovery is referred to as Sidelink (see, for example, Section 14 in Non Patent Literature 2). Sidelink transmission uses the Long Term Evolution (LTE) frame structure defined for uplink and downlink and uses a subset of uplink resources in frequency and time domains. A wireless terminal (i.e., UE) performs sidelink transmission by using Single Carrier FDMA (Frequency Division Multiple Access) (SC-FDMA), which is the same as used in uplink.

In 3GPP Release 12 ProSe, allocation of radio resources to a UE for sidelink transmission is performed by a radio access network (e.g., Evolved Universal Terrestrial Radio Access Network (E-UTRAN)). A UE that has been permitted to perform sidelink communication by a ProSe function performs ProSe Direct Discovery or ProSe Direct Communication by using radio resources allocated by a radio access network node (e.g., eNB (eNB)).

As for ProSe Direct Communication, two resource allocation modes, i.e., scheduled resource allocation and autonomous resource selection, are defined. The scheduled resource allocation and the autonomous resource selection are referred to as "sidelink transmission mode 1" and "sidelink transmission mode 2", respectively (see Section 14 in Non Patent Literature 2).

In the scheduled resource allocation for ProSe Direct Communication, when a UE desires to perform sidelink transmission, this UE requests an eNB to allocate radio resources for sidelink transmission, and the eNB allocates resources for sidelink control and data to the UE. To be specific, a UE transmits to an eNB a scheduling request to request an uplink (UL) data transmission resource (i.e., Uplink Shared Channel (UL-SCH) resource) and then transmits a Sidelink Buffer Status Report (Sidelink BSR) to the eNB by using an UL data transmission resource allocated by an uplink grant (UL grant). The eNB determines sidelink transmission resources to be allocated to the UE based on the Sidelink BSR and transmits a sidelink grant (SL grant) to the UE.

The SL grant is defined as Downlink Control Information (DCI) format 5. The SL grant (i.e., DCI format 5) contains contents such as a Resource for PSCCH, Resource block assignment and hopping allocation, and a time resource pattern index. The Resource for PSCCH indicates radio resources for a sidelink control channel (i.e., Physical Sidelink Control Channel (PSCCH)). The Resource block assignment and hopping allocation is used to determine frequency resources, i.e., a set of subcarriers (resource blocks), for transmitting a sidelink data channel (i.e., Physical Sidelink Shared Channel (PSSCH)) for sidelink data transmission. The Time resource pattern index is used to determine time resources, i.e., a set of subframes, for transmitting the PSSCH. Note that, strictly speaking, the resource block means time-frequency resources in LTE and LTE-Advanced and is a unit of resources specified by consecutive OFDM (or SC-FDMA) symbols in the time domain and consecutive subcarriers in the frequency domain. In the case of Normal cyclic prefix, one resource block includes 12 consecutive OFDM (or SC-FDMA) symbols in the time domain and 12 subcarriers in the frequency domain. That is, the Resource block assignment and hopping allocation and the Time resource pattern index designate a resource block for transmitting the PSSCH. The UE (i.e., a sidelink transmitting terminal) determines a PSCCH resource and a PSSCH resource according to the SL grant.

On the other hand, in the autonomous resource selection for ProSe Direct Communication, a UE autonomously selects resources for sidelink control (i.e., PSCCH) and data (i.e., PSSCH) from a resource pool(s) set by an eNB. The eNB may allocate a resource pool(s) for the autonomous resource selection to the UE in a System Information Block (SIB) 18. The eNB may allocate a resource pool for the autonomous resource selection to the UE in Radio Resource Control (RRC)_CONNECTED by dedicated RRC signaling. This resource pool may be usable also when the UE is in RRC IDLE.

When direct transmission is performed on a sidelink, a UE on a transmitting side (i.e., a D2D transmitting UE) (hereinafter referred to as a transmitting terminal) transmits Scheduling Assignment information by using a portion of radio resources (i.e., resource pool) for a sidelink control channel (i.e., PSCCH). The scheduling assignment information is also referred to as Sidelink Control Information (SCI) format 0. The scheduling assignment information includes contents such as resource block assignment and hopping allocation, a time resource pattern index, and a Modulation and Coding Scheme (MCS). In the case of the above-described scheduled resource allocation, the Resource block assignment and hopping allocation and the time resource pattern index indicated by the Scheduling Assignment (i.e., SCI format 0) conform to the Resource block assignment and hopping allocation and the time resource pattern index indicated by the SL grant (i.e., DCI format 5) received from the eNB.

The transmitting terminal transmits data on the PSSCH by using a radio resource according to the scheduling assignment information. A UE on a receiving side (i.e., a D2D receiving UE) (hereinafter referred to as a receiving terminal) receives the scheduling assignment information from the transmitting terminal on the PSCCH and receives the data on the PSSCH according to the received scheduling assignment information. Note that, the term "transmitting terminal" just focuses on a transmission operation of a wireless terminal and does not mean a radio terminal dedicated for transmission. Similarly, the term "receiving terminal" is an expression for expressing a receiving operation of a wireless terminal and does not mean a wireless terminal dedicated for reception. That is, the transmitting terminal is able to perform a receiving operation and the receiving terminal is able to perform a transmitting operation.

Hereinafter, a sidelink control period, a resource pool for PSCCH and a resource pool for PSSCH are described. These are required to determine radio resources (i.e., subframes and resource blocks) for transmitting a PSCCH and radio resources for transmitting a PSSCH. As described earlier, the PSCCH is a sidelink physical channel to be used for transmission of sidelink control information (SCI) such as scheduling assignment information. On the other hand, the PSSCH is a sidelink physical channel to be used for user data transmission (direct transmission).

The sidelink control period is a scheduling period for sidelink (see FIG. 1). The sidelink control period is also referred to as a PSCCH period. The transmitting terminal transmits scheduling assignment information (i.e., SCI format 0) in each sidelink control period. In 3GPP Release 12, the sidelink control period is 40 milliseconds (ms), 60 ms, 70 ms, 80 ms, 120 ms, 140 ms, 160 ms, 240 ms, 280 ms or 320 ms. In other words, the sidelink control period is 40 subframes, 60 subframes, 70 subframes, 80 subframes, 120 subframes, 140 subframes, 160 subframes, 240 subframes, 280 subframes or 320 subframes.

Therefore, the transmitting terminal notifies the receiving terminal of the allocation of PSSCH resources in each sidelink control period, i.e., every 40 ms or more. Note that, however, the allocation of PSSCH resources is specified in units of 6, 7 or 8 subframes (6, 7 or 8 ms) by use of the time resource pattern index. Thus, in one sidelink control period, the same PSSCH resource allocation is used periodically with a period of 6, 7 or 8 subframes.

In one sidelink control period, the transmitting terminal transmits scheduling assignment information (i.e., SCI format 0) two times in two subframes out of $L_{PSCCH}$ number of subframes contained in a resource pool (subframe pool) for PSCCH. The two times of transmission is performed in two different resource blocks among $m^{PSCCH\_RP}_{RB}$ number of resource blocks contained in a resource pool (resource block pool) for PSCCH.

The resource pool for PSCCH is set to a UE by an eNB via broadcasting (SIB 18) or dedicated RRC signaling. The resource pool for PSCCH consists of $L_{PSCCH}$ number of subframes and $M^{PSCCH\_RP}_{RB}$ number of frequency domain resource blocks in a sidelink control period.

A method for specifying a resource pool for PSCCH is described hereinafter with reference to FIGS. 2 and 3. A PSCCH resource pool consists of a subframe pool and a resource block pool. FIG. 2 shows a PSCCH subframe pool, and FIG. 3 shows a resource block pool for PSCCH.

An eNB specifies a length (P) of the sidelink control period (PSCCH period), and a PSCCH subframe bitmap and its length (N') in order to identify the PSCCH subframe pool. The length (N') of the subframe bitmap is 4, 8, 12, 16, 30, 40 or 42 bits. The N' subframes corresponding to the subframe bitmap are the first N' subframes within the sidelink control period as shown in FIG. 2. The subframe bitmap indicates that a subframe corresponding to a bit that is set to "0" is not used for PSCCH transmission and a subframe corresponding to a bit that is set to "1" can be used for PSCCH transmission. Accordingly, the number of subframes ($L_{PSCCH}$) contained in the PSCCH resource pool in one sidelink control period is equal to the number of bits that are set to "1" within the subframe bitmap. The subframes contained in the PSCCH resource pool (i.e., subframe pool) can be represented as follows:

$$(l_0^{PSCCH}, l_1^{PSCCH}, \ldots, l_{L_{PSCCH}-1}^{PSCCH}). \qquad [\text{Expression 1}]$$

On the other hand, as shown in FIG. 3, the eNB specifies the index (S1) of a start Physical Resource Block (PRB), the index (S2) of an end PRB, and the number of PRBs (M) in order to identify a resource block pool for PSCCH. The resource block pool contains M number of PRBs the PRB index q of each of which is equal to or more than the start index (S1) and less than S1+M (i.e., S1<=q<S1+M) and M number of PRBs the PRB index q of each of which is more than S2−M and equal to or less than the end index (S2) (i.e., S2−M<q<=S2), i.e., the total number of PRBs is 2M. Thus, the eNB can include two PRB clusters, each containing M number of PRBs, into the resource block pool for PSCCH.

A method for specifying a resource pool for PSSCH is described hereinafter. In the case of the scheduled resource allocation (i.e., sidelink transmission mode 1), the eNB specifies a PSSCH subframe pool via SIB 18 or dedicated signaling (RRC signaling). The sidelink control period (PSCCH period) that is associated with the PSCCH resource configuration is also associated with the PSSCH resource configuration. The UE determines the PSSCH resource pool consisting of a subframe pool as follows. Specifically, as shown in FIG. 2, in the sidelink control period (PSCCH period), subframes each having the subframe index equal to or more than $1^{PSCCH}_{PSCCH}+1$ belong to the PSSCH subframe pool.

On the other hand, in the case of the autonomous resource selection (i.e., sidelink transmission mode 2), the eNB specifies a PSSCH subframe pool and a resource block pool via SIB 18 or dedicated signaling (RRC signaling). The eNB specifies an offset ($O_2$), a subframe bitmap and its length ($N_B$) in order to specify the subframe pool.

The offset ($O_2$) indicates an offset from the subframe index $j_{begin}$ of the first subframe in the sidelink control period (i.e., PSCCH period). In this example, it is assumed that the number of subframes each having the subframe index equal to or more than $j_{begin}O_2$ in the PSCCH period is N'.

The length ($N_B$) of the subframe bitmap is 4, 8, 12, 16, 30, 40 or 42 bits. The subframe bitmap indicates that a subframe corresponding to a bit that is set to "0" is not used for PSSCH transmission and a subframe corresponding to a bit that is set to "1" can be used for PSSCH transmission. Note that, in normal cases, the length ($N_B$) of the subframe bitmap is smaller than the total number (N') of subframes each having the subframe index equal to or more than $j_{begin}+O_2$ in the PSCCH period. Thus, the UE determines a bitmap $b_0$, $b_1, b_2, \ldots, b_{N'-1}$ using the following equation:

$$b_j = a_{j \bmod N_B}, \text{ for } 0 \leq j < N', \quad \text{[Expression 2]}$$

where $a_0, a_1, a_2, a_{N\_B-1}$ is the bitmap with the length $N_B$ that is indicated in the PSSCH configuration by the eNB. If $b_j=1$, a subframe $1_j$ belongs to the PSSCH subframe pool.

The resource block pool for PSSCH in the case of the autonomous resource selection (sidelink transmission mode 2) is specified in the same manner as the resource block pool for PSCCH. Specifically, in order to identify the resource block pool for PSSCH, the eNB specifies the index (S1) of a start Physical Resource Block (PRB), the index (S2) of an end PRB, and the number of PRBs (M) by the PSSCH resource configuration.

CITATION LIST

Non Patent Literature

Non-patent Literature 1: 3GPP TS 23.303 V12.7.0 (2015-12), "3rd Generation Partnership Project; Technical Specification Group Services and System Aspects; Proximity-based services (ProSe); Stage 2 (Release 12)", December 2015

Non-patent Literature 2: 3GPP TS 36.213 V12.5.0 (2015-03), "3rd Generation Partnership Project; Technical Specification Group Radio Access Network; Evolved Universal Terrestrial Radio Access (E-UTRA); Physical layer procedures (Release 12)", March 2015

SUMMARY OF INVENTION

Technical Problem

As described above, in 3GPP Release 12, radio resources for sidelink transmission are scheduled per sidelink control period (i.e., PSCCH period). That is, a sidelink transmitting terminal transmits scheduling assignment information (i.e., SCI format 0) indicating sidelink transmission resources to a receiving terminal every sidelink control period (i.e., PSCCH period). Accordingly, the transmitting terminal has to accept a delay depending on the length of the sidelink control period from when data to be transmitted on the sidelink occurs to when the transmitting terminal transmits this data. Even when the length of the sidelink control period is the shortest length of 40 ms, a transmission delay could be up to about 35 ms. The presence of such a transmission delay could prevent D2D communication from being applied to an application having a strict latency requirement (i.e., an application requiring a low latency). For example, some applications relating to Vehicle-to-Vehicle (V2V) communication and Vehicle-to-Infrastructure (V2I) communication may require a low-latency capability in the order of ten milliseconds for the D2D communication.

One of the objects to be attained by embodiments disclosed herein is to provide an apparatus, a method, and a program that contribute to facilitating applying D2D communication to a communication service requiring a low latency.

Solution to Problem

In a first aspect, a network apparatus includes a memory and at least one processor. The at least one processor is configured to transmit, to at least one of a D2D transmitting terminal and a D2D reception terminal, a first control signal including an indication indicating which of first and second device-to-device (D2D) transmission modes is to be activated. The first D2D transmission mode conforms to a first resource pattern that is repeated every first time period. Each first resource pattern includes: a control channel subframe pool used to transmit, from the D2D transmitting terminal to the D2D receiving terminal, first D2D control information indicating resource allocation for data transmission; and a data channel subframe pool used for data transmission from the D2D transmitting terminal to the D2D receiving terminal in accordance with the first D2D control information. The second D2D transmission mode conforms to a second resource pattern that is repeated every second time period, the second time period being the same as or different from the first time period. Each second resource pattern includes a data channel subframe pool used for data transmission from the D2D transmitting terminal to the D2D receiving terminal. Each second resource pattern is defined so that:

(a) within one second resource pattern or two adjacent second resource patterns, a plurality of control channel subframe pools used for transmission of the first D2D control information appear at an interval shorter than the first time period;

(b) each second resource pattern includes a control channel subframe pool used to transmit second D2D control information indicating resource allocation for data transmission performed in a plurality of consecutive second time periods; or (c) each second resource pattern does not include a control channel subframe pool used for transmission of the first or second D2D control information.

In a second aspect, a method performed by a network apparatus includes transmitting, to at least one of a D2D transmitting terminal and a D2D reception terminal, a first control signal including an indication indicating which of first and second device-to-device (D2D) transmission modes is to be activated. Definitions of the first and second transmission modes are similar to those in the first aspect.

In a third aspect, a radio terminal includes a memory and at least one processor. The at least one processor is configured to receive a first control signal including an indication indicating which of first and second device-to-device (D2D) transmission modes is to be activated, and upon receiving the first control signal, perform D2D communication in accordance with the second D2D transmission mode. Definitions of the first and second transmission modes are similar to those in the first aspect.

In a fourth aspect, a method performed by a radio terminal includes receiving a first control signal including an indication indicating which of first and second device-to-device (D2D) transmission modes is to be activated, and upon receiving the first control signal, performing D2D communication in accordance with the second D2D transmission mode. Definitions of the first and second transmission modes are similar to those in the first aspect.

In a fifth aspect, a program includes a set of instructions (software codes) that, when loaded into a computer, causes the computer to perform a method according to the above-described second or fourth aspect.

Advantageous Effects of Invention

According to the above-described aspects, it is possible to provide an apparatus, a method, and a program that contribute to facilitating applying D2D communication to a communication service requiring a low latency.

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

The following descriptions on the embodiments mainly focus on specific examples with regard to improvements of ProSe specified in 3GPP Release 12 (LTE-Advanced). However, these embodiments are not limited to the LTE-Advanced and its improvements and may also be applied to D2D communication in other mobile communication networks or systems.

First Embodiment

Figure 4:
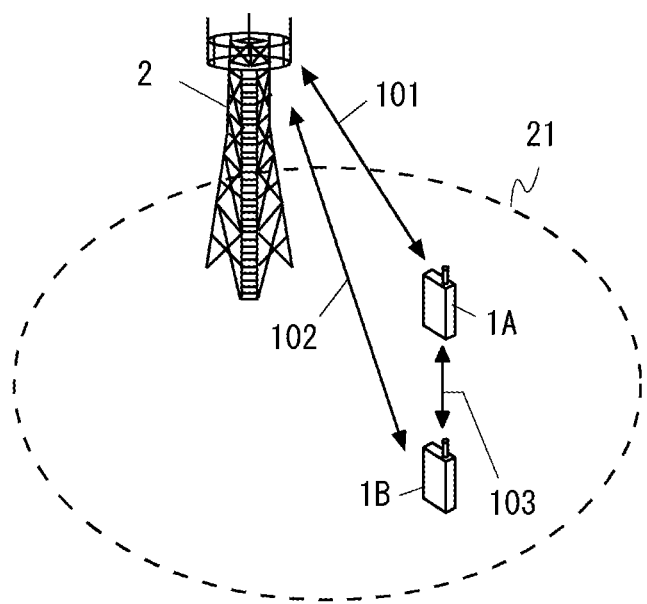
FIG. 4 is a diagram showing a configuration example of a radio communication system according to some embodiments.

FIG. 4 shows a configuration example of a wireless communication system according to some embodiments including this embodiment. Wireless terminals (UEs) 1A and 1B each include at least one wireless transceiver and are configured to perform cellular communication (101 or 102) with a base station (eNB) 2 and perform D2D communication on a device-to-device direct interface (e.g., PC5 interface or sidelink) 103. This D2D communication includes at least Direct Communication (i.e., ProSe Direct Communication) and may further include Direct Discovery (i.e., ProSe Direct Discovery). The ProSe Direct Communication is direct communication using sidelink transmission and is also referred to as Sidelink Direct Communication. Similarly, the ProSe Direct Discovery is a direct discovery using sidelink transmission and is also referred to as Sidelink Direct Discovery.

The eNB 2 manages a cell 21 and is able to perform cellular communication (101 or 102) with each of the plurality of UEs 1 by using a cellular communication technology (e.g., Evolved Universal Terrestrial Radio Access (E-UTRA) technology). Although the example shown in FIG. 5 indicates an arrangement where the UEs 1A and 1B are located in the same cell 21 for simplification of description, such arrangement is just one example. For example, the UE 1A may be located in one of two cells that are adjacent to each other and are managed by different eNBs 2, and the UE 1B may be located in the other cell. Alternatively, at least one of the UE 1A and the UE 1B may be located outside the coverage of one or more eNBs 2.

In the following, a control procedure for sidelink communication according to this embodiment will be described. Here, it is assumed that: the UE 1A is a sidelink transmitting terminal; the UE 1B is a sidelink receiving terminal; and sidelink transmission from the UE 1A to the UE 1B is performed.

Figure 5:
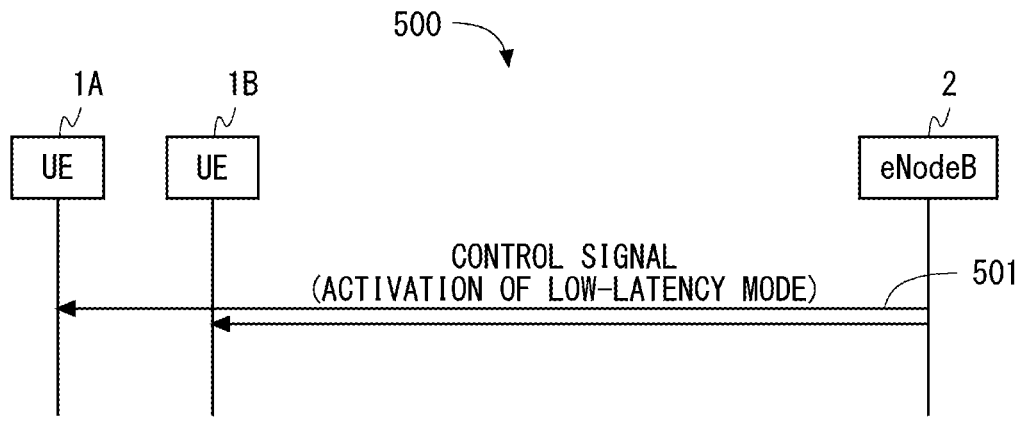
FIG. 5 is a sequence diagram showing an example of operations performed by a base station, a transmitting terminal, and a receiving terminal according to a first embodiment.

FIG. 5 is a sequence diagram showing a process 500, which is an example of operations performed by the UEs 1A and 1B and the eNB 2. In Step 501, the eNB 2 transmits, to the UEs 1A and 1B, a control signal indicating which of a normal mode and a low-latency mode is to be activated for D2D communication (i.e., sidelink transmission) between the UEs 1A and 1B. The normal mode is a normal sidelink transmission mode and the low-latency mode is a sidelink transmission mode for low-latency applications. Details of the normal mode and the low-latency mode will be described later. When the control signal indicates activation of the low-latency mode, the transmitting terminal (UE 1A) transmits data on the sidelink in accordance with the low-latency mode and the receiving terminal (UE 1B) receives the data in accordance with the low-latency mode.

Figure 6:
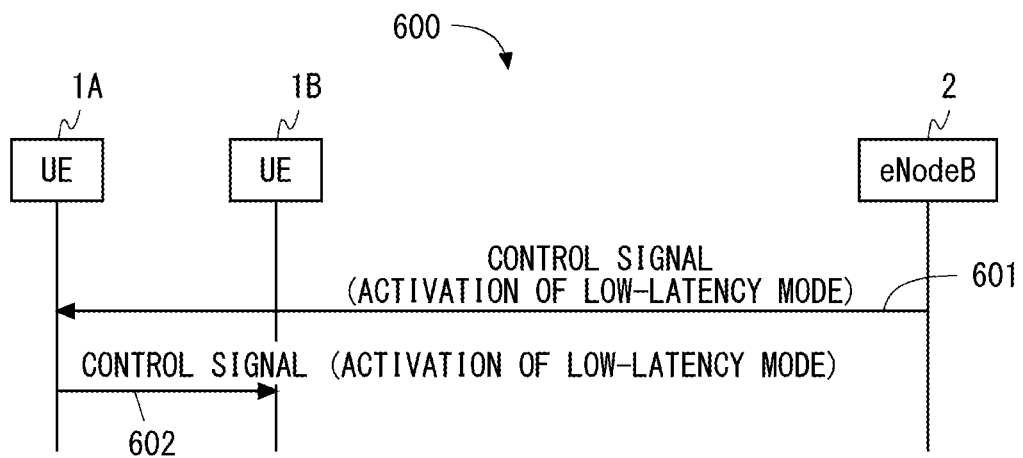
FIG. 6 is a sequence diagram showing an example of operations performed by a base station, a transmitting terminal, and a receiving terminal according to the first embodiment.

As shown in FIG. 6, the eNB 2 may transmit the control signal to only one of the UEs 1A and 1B, for example, only to the transmitting terminal (UE 1A). FIG. 6 is a sequence diagram showing a process 600, which is another example of operations performed by the UEs 1A and 1B and the eNB 2. In Step 601, the eNB 2 transmits a control signal indicating which of the normal mode and the low-latency mode is to be activated for D2D communication (sidelink transmission) between the UEs 1A and 1B to the transmitting terminal (the UE 1A). In Step 602, upon receiving the control signal from the eNB 2, the transmitting terminal (UE 1A) informs the receiving terminal (UE 1B) about the content of the control signal through the sidelink.

In the case of the scheduled resource allocation (i.e., sidelink transmission mode 1), the eNB 2 may incorporate the control signal, which indicates which of the normal mode and the low-latency mode is to be activated, into a sidelink scheduling grant (DCI format 5). In the case of the autonomous resource selection (sidelink transmission mode 2), the eNB 2 may transmit the control signal to the UEs 1A and 1B using a PSCCH resource configuration or a PSSCH resource configuration transmitted by SIB 18 or RRC signaling.

Details of the normal mode and the low-latency mode are described hereinafter. The UEs 1A and 1B are configured to operate in the normal sidelink transmission mode (i.e., the normal mode) and the sidelink transmission mode for low-latency applications (i.e., the low-latency mode). The normal mode may be, for example, sidelink transmission in accordance with 3GPP Release 12 described in the Background Art. Specifically, in the normal mode, the transmitting terminal (UE 1A) may transmit the scheduling assignment information, which indicates sidelink transmission resources (i.e., SCI format 0), to the receiving terminal (UE 1B) every sidelink control period (PSCCH period) that is between 40 ms and 320 ms. As previously described, in the normal mode, even when the length of the sidelink control period is the shortest length of 40 ms, a transmission delay could be up to about 35 ms.

Figure 1:
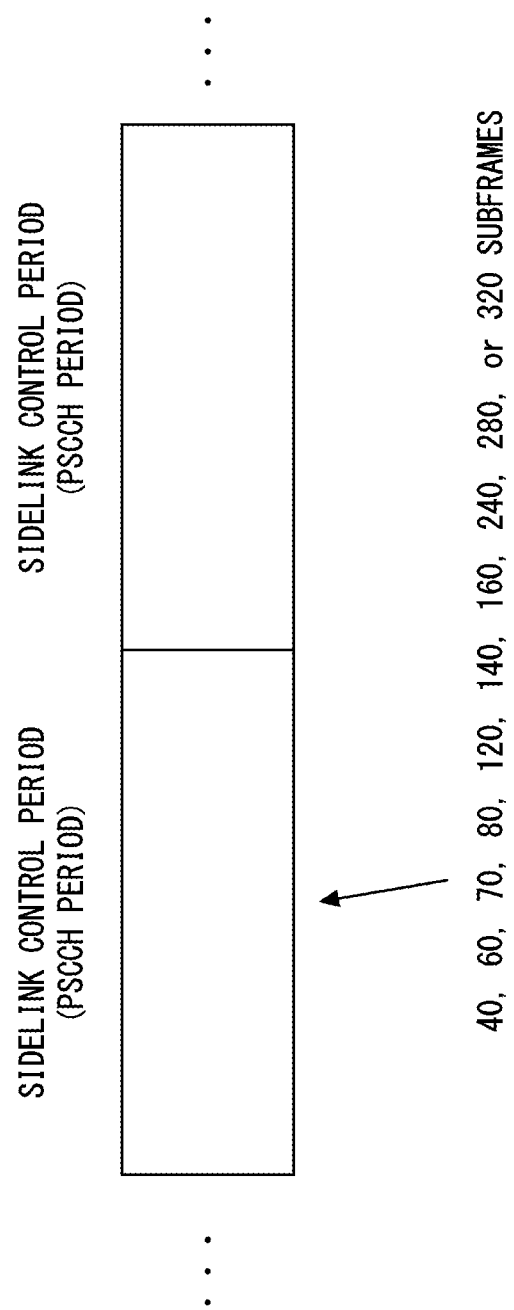
FIG. 1 is a diagram showing a sidelink control period (PSCCH period)
Figure 2:
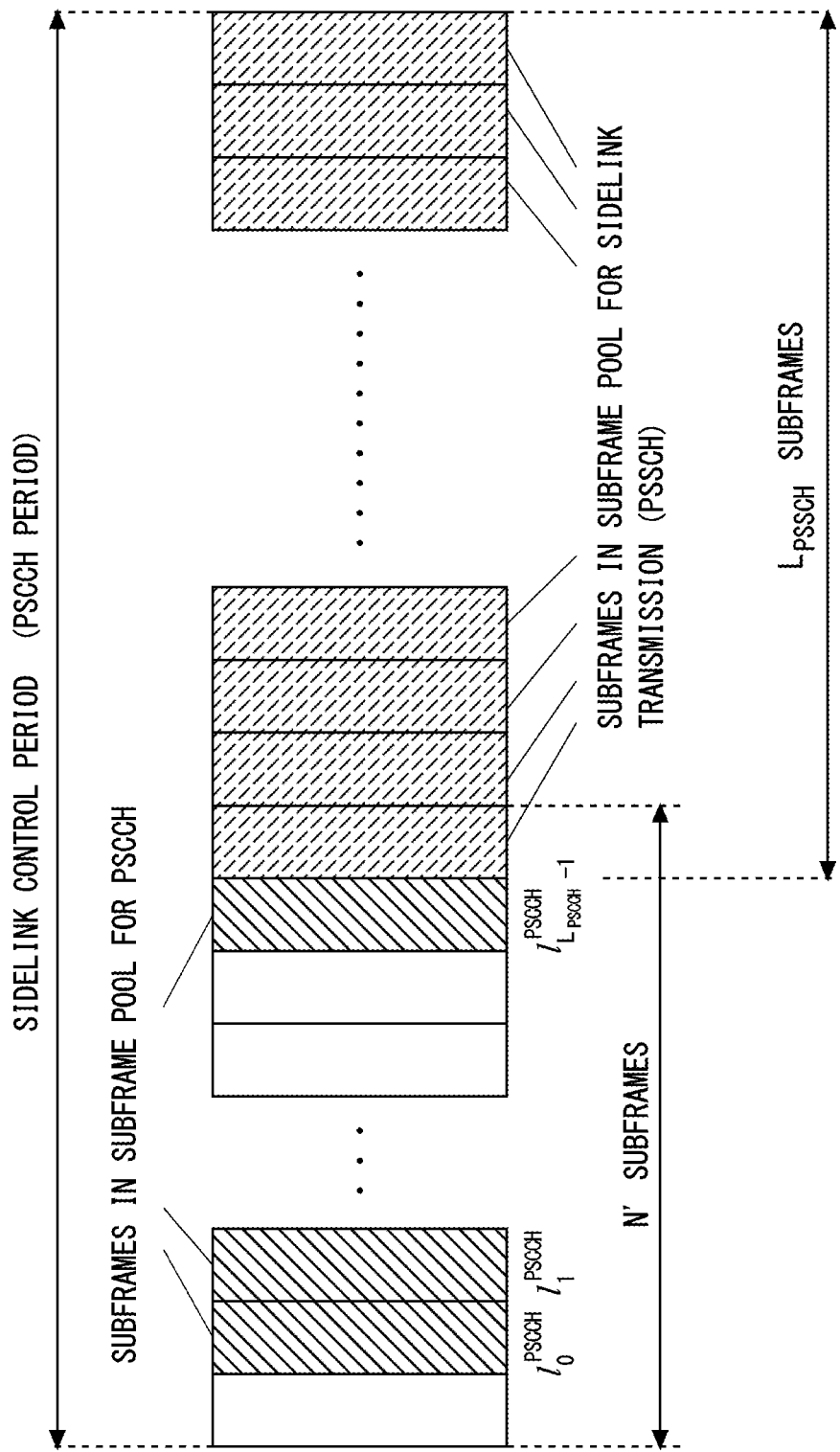
FIG. 2 is a diagram showing an example of a PSCCH subframe pool and a PSSCH subframe pool in a sidelink control period.
Figure 3:
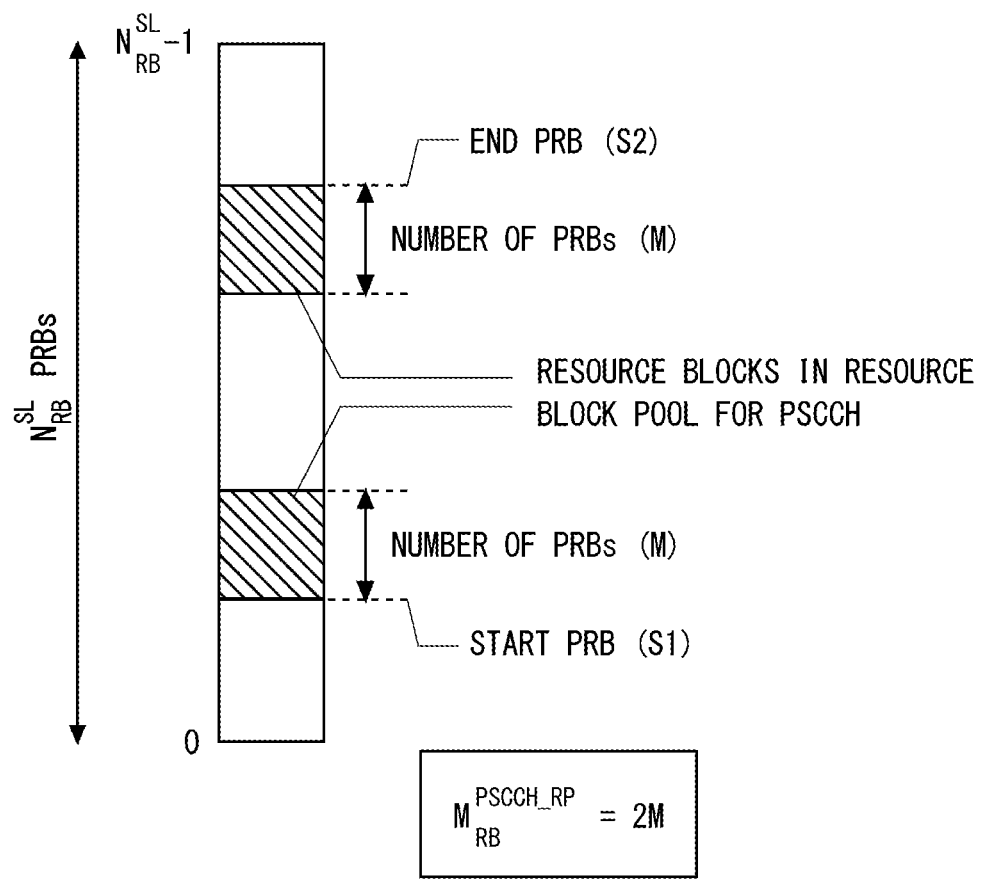
FIG. 3 is a diagram showing an example of a PSCCH resource block pool in a sidelink control period.

The normal mode conforms to a first resource pattern that is repeated every first time period (i.e., the sidelink control period). As described above with reference to FIGS. 1 and 2, the first resource pattern includes a control channel subframe pool (i.e., the PSCCH subframe pool) and a data channel subframe pool (i.e., the PSSCH subframe pool). The PSCCH subframe pool consists of $L_{PSCCH}$ number of subframes usable for transmission of sidelink control information (SCI) including scheduling assignment information (i.e., SCI format 0). Meanwhile, the PSSCH subframe pool consists of $L_{PSSCH}$ number of subframes usable for data transmission (i.e., PSSCH transmission) on the sidelink from the transmitting terminal (UE 1A) to the receiving terminal (UE 1B) in accordance with the scheduling assignment information (i.e., SCI format 0).

In contrast to this, the low-latency mode enables the UEs 1A and 1B to perform sidelink transmission with a lower delay than that in the normal mode. The low-latency mode conforms to a second resource pattern that is repeated every second time period. The second time period may be the same as or different from the first time period used in the normal mode. The second resource pattern includes a data channel subframe pool consisting of a plurality of subframes usable for data transmission on the sidelink from the transmitting terminal (UE 1A) to the receiving terminal (UE 1B). Specific examples 1 to 6 of the second resource pattern are described below.

Example 1

Figure 7:
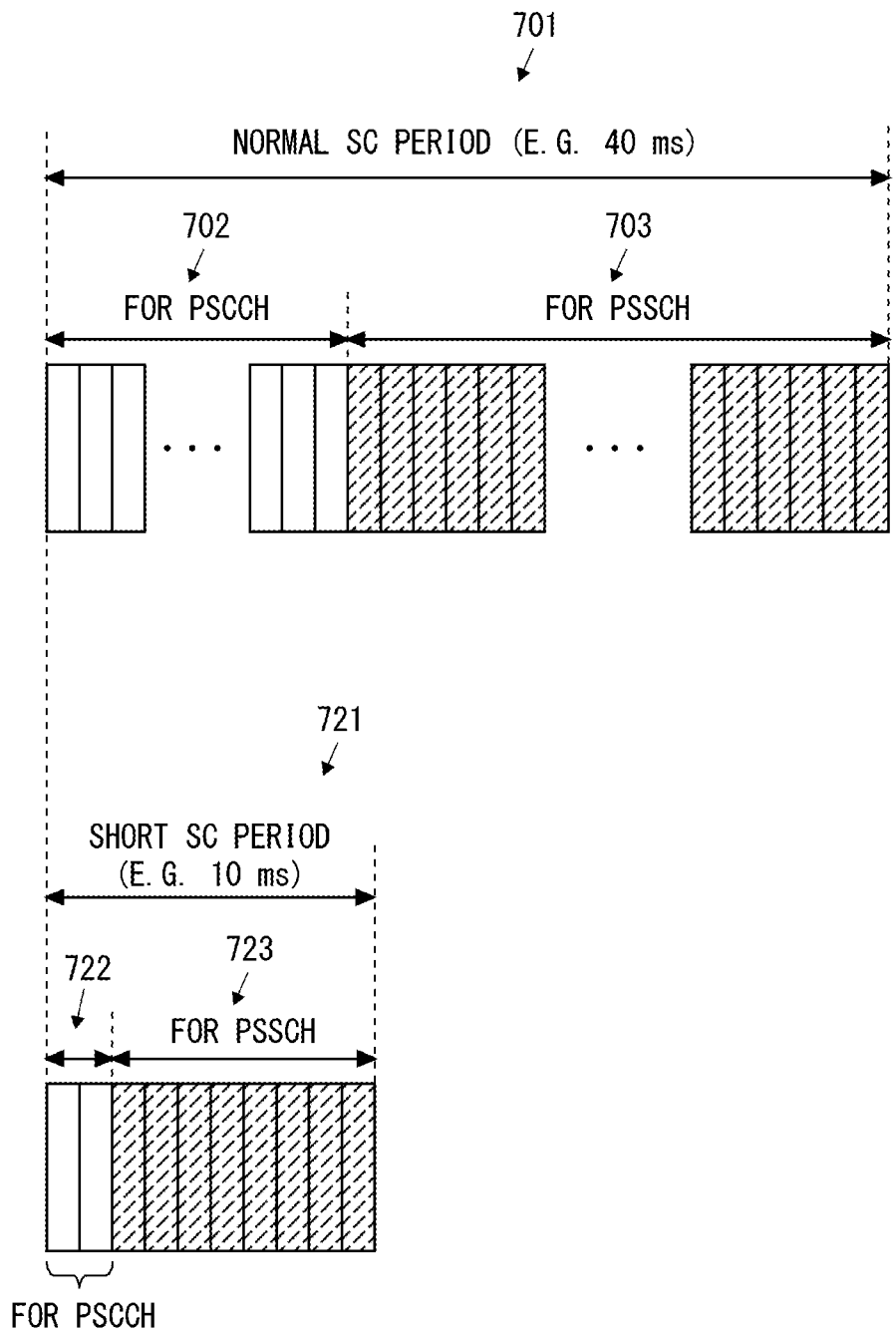
FIG. 7 is a diagram for explaining an example of a resource pattern for a low-latency mode.

FIG. 7 shows a pattern 701 that is a specific example of the first resource pattern used in the normal mode and a pattern 721 that is a specific example of the second resource pattern used in the low-latency mode. The first resource pattern 701 conforms to the normal sidelink control (SC) period (e.g., 40 ms). The first resource pattern 701 includes a PSCCH subframe pool 702 and a PSSCH subframe pool 703.

Meanwhile, the second resource pattern 721 conforms to a sidelink control period (e.g., 10 ms) shorter than the sidelink control period (e.g., 40 ms) of the first resource pattern 701. The second resource pattern 721 includes a PSCCH subframe pool 722 and a PSSCH subframe pool 723. The length of the short SC period of the second resource pattern 721 may be determined depending on the length of a transmission delay (or a permissible delay) permitted for sidelink transmission for low-latency applications. The length of the short SC period of the second resource pattern 721 may be set to a length equal to or shorter than the length of the permissible delay for low-latency applications. In this way, the transmitting terminal (UE 1A) can lower the transmission delay from when data to be transmitted on the sidelink occurs to when the transmitting terminal (UE 1A) transmits this data to or below the permissible delay.

Example 2

Figure 8:
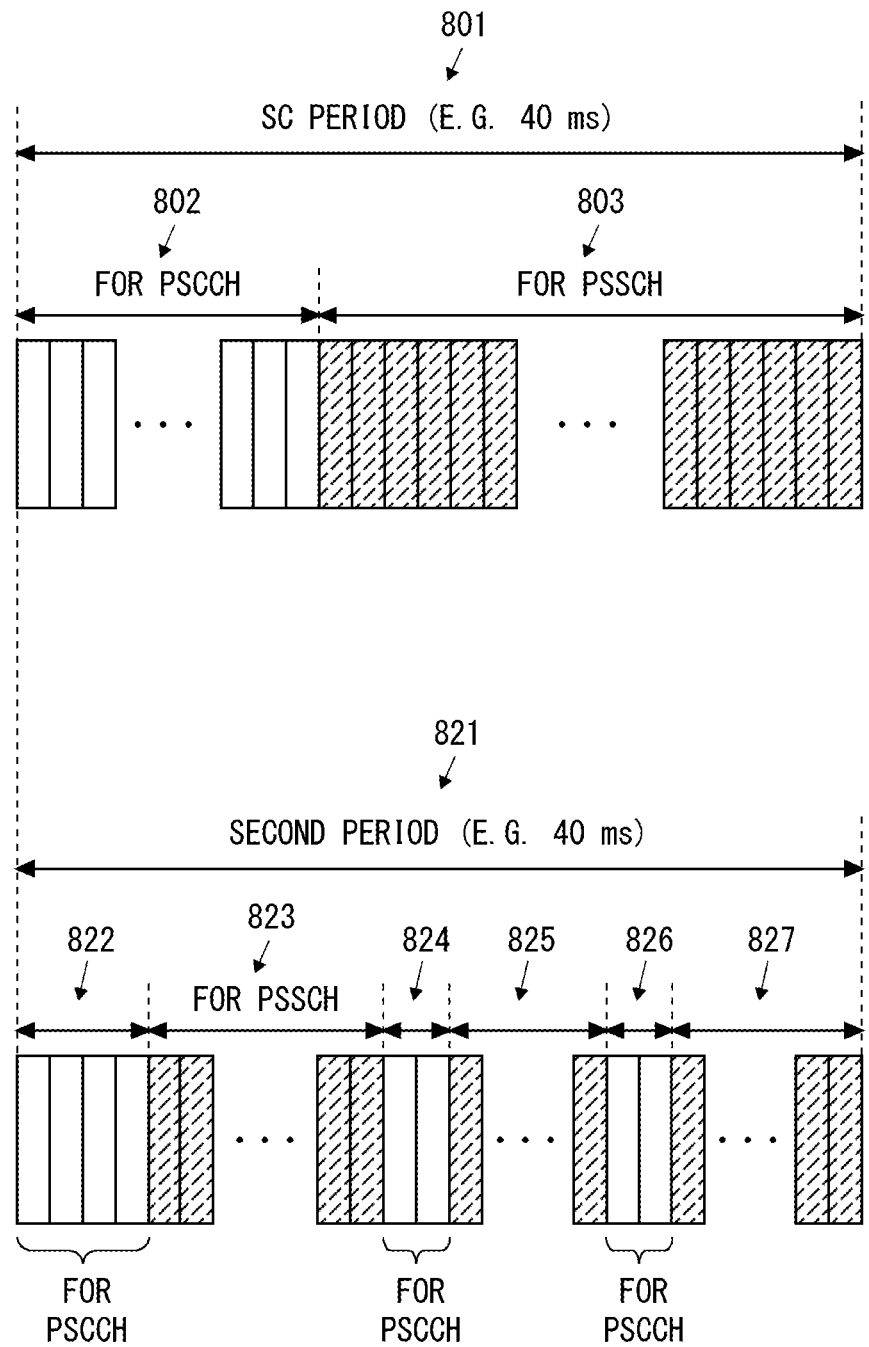
FIG. 8 is a diagram for explaining an example of a resource pattern for a low-latency mode.

FIG. 8 shows a pattern 801 that is a specific example of the first resource pattern used in the normal mode and a pattern 821 that is a specific example of the second resource pattern used in the low-latency mode. The structure of the first resource pattern 801 is similar to that of the first resource pattern 701 shown in FIG. 7. Specifically, the first resource pattern 801 includes a PSCCH subframe pool 802 and a PSSCH subframe pool 803.

The second resource pattern 821 includes a plurality of PSCCH subframe pools 822, 824 and 826 within one second time period (e.g., 40 ms). The PSCCH subframe pool 822 is used to transmit scheduling assignment information (i.e., SCI format 0) for designating, from the following PSSCH subframe pool 823, one or more subframes to be used for data transmission performed by the UE 1A. Similarly, the PSCCH subframe pool 824 is used to transmit scheduling assignment information (i.e., SCI format 0) for designating, from the following PSSCH subframe pool 825, one or more subframes to be used for data transmission performed by the UE 1A. Similarly, the PSCCH subframe pool 826 is used to transmit scheduling assignment information (i.e., SCI format 0) for designating, from the following PSSCH subframe pool 827, one or more subframes to be used for data transmission performed by the UE 1A.

Note that, the interval between two adjacent PSCCH subframe pools 822 and 824 is shorter than the first time period (i.e., the normal SC period (e.g., 40 ms)). Similarly, the interval between two adjacent PSCCH subframe pools 824 and 826 is shorter than the first time period (i.e., normal SC period (e.g., 40 ms)). The interval between two adjacent PSCCH subframe pools may be set to a length equal to or shorter than the length of the permissible delay for low-latency applications. In this way, the transmitting terminal (UE 1A) can lower the transmission delay from when data to be transmitted on the sidelink occurs to when the transmitting terminal (UE 1A) transmits this data to or below the permissible delay.

In the example shown in FIG. 8, the time period to which the second resource pattern 821 conforms (i.e., the second time period) is equal to the time period to which the first resource pattern 801 conforms (i.e., the SC period). However, the time period to which the second resource pattern 821 conforms may be shorter or longer than the time period to which the first resource pattern 801 conforms.

In the example shown in FIG. 8, the scheduling assignment information (i.e., SCI format 0) transmitted by the transmitting terminal (UE 1A) in the PSCCH subframe pool 822, 824 or 826 may include an "offset value" for designating PSSCH resources for data transmission. This offset value may indicate an offset from the subframe index of the PSCCH subframe in which the scheduling assignment information (i.e., SCI format 0) is transmitted. Note that, in the example shown in FIG. 8, the interval between PSCCH subframe pools is sufficiently short as described above. Accordingly, it may be unnecessary to designate a set of PSSCH subframes for data transmission. In such a case, the scheduling assignment information (i.e., SCI format 0) does not necessarily have to include a Time Resource Pattern (TRP) index.

Example 3

In the third example, the second resource pattern to which the low-latency mode conforms may be the same as the first resource pattern to which the normal mode conforms. That is, in the low-latency mode, the UEs 1A and 1B may use the same sidelink control period as in the normal mode, and also use the same PSCCH subframe pool and the same PSSCH subframe pool as in the normal mode.

However, in the third example, the transmitting terminal (UE 1A), which operates in the low-latency mode, transmits scheduling assignment information every sidelink control period and secures PSSCH resources for data transmission in advance every sidelink control period. The longest interval between PSSCH resources that are secured in advance may be set to a length equal to or shorter than the length of the permissible delay for low-latency applications. Further, the length of the PSCCH subframe pool of each sidelink control period may be set to a length shorter than the length of the permissible delay for low-latency applications. In this way, the transmitting terminal (UE 1A) can lower the transmission delay from when data to be transmitted on the sidelink occurs to when the transmitting terminal (UE 1A) transmits this data to or below the permissible delay.

Note that, in the case of the scheduled resource allocation (i.e., sidelink transmission mode 1), the eNB 2 may transmit a sidelink scheduling grant (DCI format 5) indicating a PSSCH resource to the transmitting terminal (UE 1A) every sidelink control period. Alternatively, in the case of the scheduled resource allocation, the eNB 2 may configure the transmitting terminal (UE 1A) with PSSCH resources to be used for data transmission performed in a plurality of consecutive sidelink control periods, using a PSCCH resource configuration or a PSSCH resource configuration through RRC signaling (e.g., an RRC Connection Reconfiguration message). Similarly, in the case of the autonomous resource selection (sidelink transmission mode 2), the eNB 2 may configure the transmitting terminal (UE 1A) with PSSCH resources for data transmission performed in a plurality of consecutive sidelink control periods, using a PSCCH resource configuration or a PSSCH resource configuration through RRC signaling (e.g., an RRC Connection Reconfiguration message).

Example 4

Similarly to the above-described third example, in the fourth example, the transmitting terminal (UE 1A) operating in the low-latency mode secures PSSCH resources for data transmission in advance every sidelink control period. However, transmitting the sidelink control information (SCI format 0) every sidelink control period causes a waste of PSCCH radio resources. To address this problem, in the fourth example, the transmitting terminal (UE 1A) transmits special sidelink control information in one or more subframes (e.g., two subframes) within the PSCCH subframe pool in a j-th sidelink control period. The special sidelink control information includes a first information element (i.e., scheduling assignment information (SCI format 0)) for specifying one or more subframes within the PSSCH subframe pool in the j-th sidelink control period. In addition, the special sidelink control information includes a second information element indicating whether the radio resource allocation for data transmission (i.e., PSSCH transmission) indicated by this sidelink control information remains valid in at least one of the (j+1)th and subsequent sidelink control periods. That is, the transmitting terminal (UE 1A) performs continuous (i.e., persistent or semi-persistent) resource allocation for sidelink transmission to the receiving terminal (UE 1B).

The transmitting terminal (UE 1A) performs the data transmission on the PSSCH without transmitting new sidelink control information (i.e., scheduling assignment information (SCI format 0)) in at least one of the (j+1)th and subsequent sidelink control periods in which the radio resource allocation for the data transmission in the j-th sidelink control period remains valid. Meanwhile, the receiving terminal (UE 1B) performs the data reception on the PSSCH without receiving new sidelink control information (i.e., scheduling assignment information) in the (j+1)th and subsequent sidelink control periods when the radio resource allocation for the data transmission in the j-th sidelink control period remains valid in at least one of the (j+1)th and subsequent sidelink control periods.

In some implementations, the second information element included in the special sidelink control information may specify the length of the at least one of the (j+1)th and subsequent sidelink control periods (i.e., at least one sidelink control period in which the radio resource allocation for the data transmission in the j-th sidelink control period remains valid). For example, the second information element may specify the number of sidelink control periods during which the sidelink control information (i.e., scheduling assignment information (SCI format 0)) transmitted in the j-th sidelink control period is valid. For example, the transmitting terminal (UE 1A) may determine the number of sidelink control periods in which the radio resource allocation remains valid, depending on the permissible delay for low-latency applications. The permissible delay may be at least one of a maximum delay, an average delay, and a priority related to a delay guarantee.

Alternatively, in some implementations, the second information element may indicate whether the radio resource allocation for data transmission in the j-th sidelink control period is maintained or not. The second information element may be flag information indicating whether or not the radio resource allocation is maintained. For example, the second information element may be 1-bit flag information. The flag with a value of "1" may indicate that the radio resource allocation for data transmission in the j-th sidelink control period is valid also in the (j+1)th and subsequent sidelink control periods. On the other hand, the flag with a value of "0" may indicate that the radio resource allocation for data transmission in the j-th sidelink control period is valid only in the j-th sidelink control period.

Figure 9:
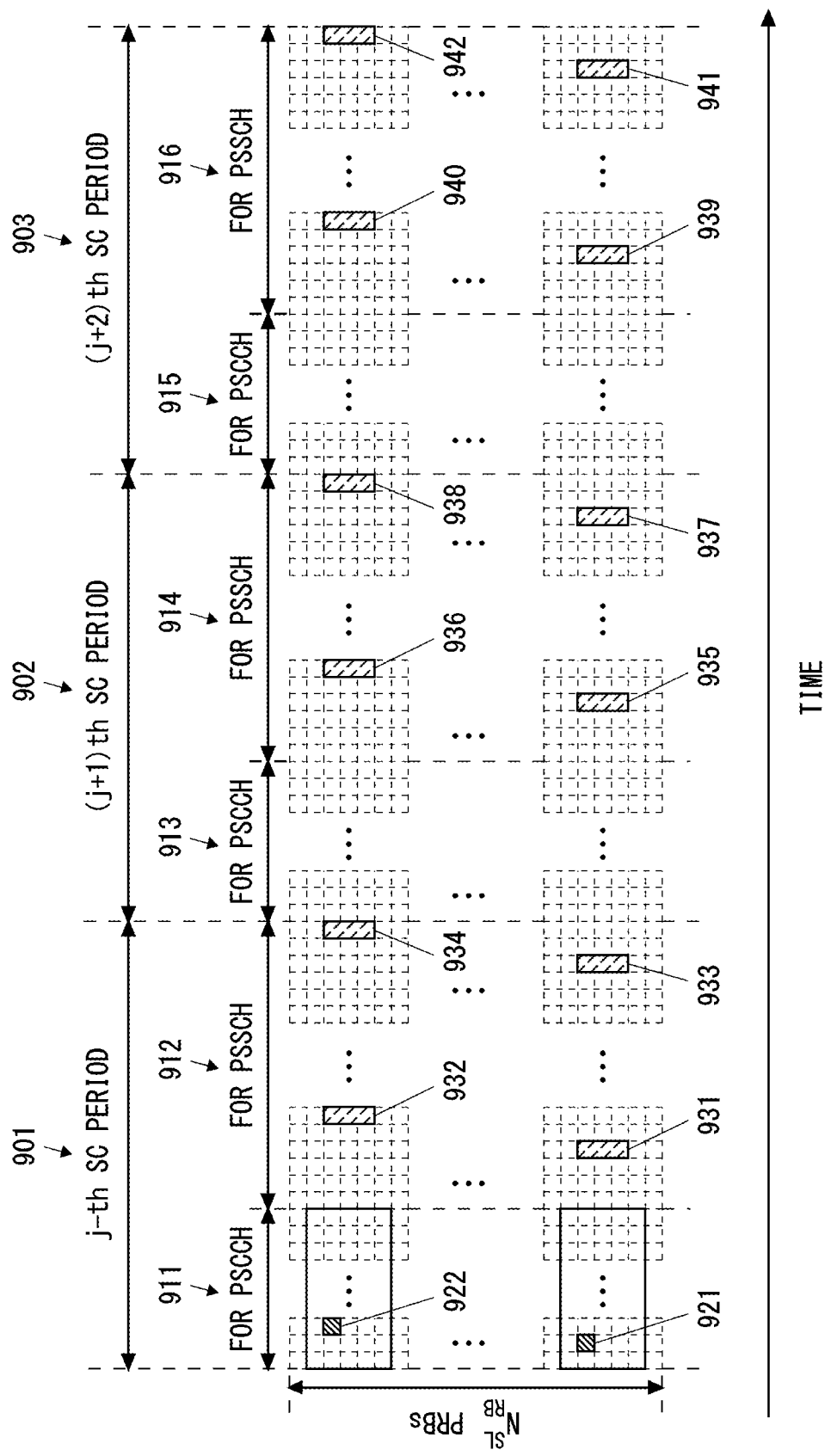
FIG. 9 is a diagram for explaining an example of a resource pattern for a low-latency mode.

FIG. 9 is a diagram showing an example of PSCCH transmission and PSSCH transmission according to the fourth example. In the example shown in FIG. 9, the transmitting terminal (UE 1A) transmits the sidelink control information in two subframes within a PSCCH subframe pool 911 in the j-th sidelink control period (PSCCH period) 901 on the PSCCH (922 and 923). The sidelink control information 922 and 923 include the scheduling assignment information (i.e., SCI format 0), and indicate that this scheduling assignment information is also valid in the (j+1)th sidelink control period 902 and subsequent periods.

The transmitting terminal (UE 1A) performs data transmissions (PSSCH transmissions) 931 to 934 in accordance with the sidelink control information 922 and 923 in a plurality of subframes within the PSSCH subframe pool 912 in the j-th sidelink control period 901. Further, the transmitting terminal (UE 1A) performs data transmissions (PSSCH transmissions) 935 to 938 in the PSSCH subframe pool 914 in the (j+1)th sidelink control period 902 without transmitting sidelink control information in the PSCCH subframe pool 913 in the (j+1)th sidelink control period 902. The data transmissions (PSSCH transmissions) 935 to 938 are performed in accordance with the sidelink control information 922 and 923 transmitted previously in the j-th sidelink control period 901. Likewise, the transmitting terminal (UE 1A) performs data transmissions (PSSCH transmissions) 939 to 942 in the PSSCH subframe pool 916 in the (j+2)th sidelink control period 903 without transmitting sidelink control information in the PSCCH subframe pool 915 in the (j+2)th sidelink control period 903. The data transmissions (PSSCH transmissions) 939 to 942 are performed in accordance with the sidelink control information 922 and 923 transmitted previously in the j-th sidelink control period 901.

Similarly to the above-described third example, according to the fourth example, the transmitting terminal (UE 1A) can lower the transmission delay from when data to be transmitted on the sidelink occurs to when the transmitting terminal (UE 1A) transmits this data to or below the permissible delay. Further, according to the fourth example, it is possible to reduce a waste of the PSCCH resources.

In the fourth example, in the case of the scheduled resource allocation (i.e., sidelink transmission mode 1), the eNB 2 may transmit a sidelink scheduling grant (DCI format 5) indicating PSSCH resources to the transmitting terminal (UE 1A) every sidelink control period. Alternatively, in the case of the scheduled resource allocation, the eNB 2 may configure the transmitting terminal (UE 1A) with PSSCH resources for data transmission performed in a plurality of consecutive sidelink control periods, using a PSCCH resource configuration or a PSSCH resource configuration through RRC signaling (RRC Connection Reconfiguration message). Similarly, in the case of the autonomous resource selection (sidelink transmission mode 2), the eNB 2 may configure the transmitting terminal (UE 1A) with PSSCH resources for data transmission performed in a plurality of consecutive sidelink control periods, using a PSCCH resource configuration or a PSSCH resource configuration through RRC signaling (e.g., RRC Connection Reconfiguration message).

Example 5

Figure 10:
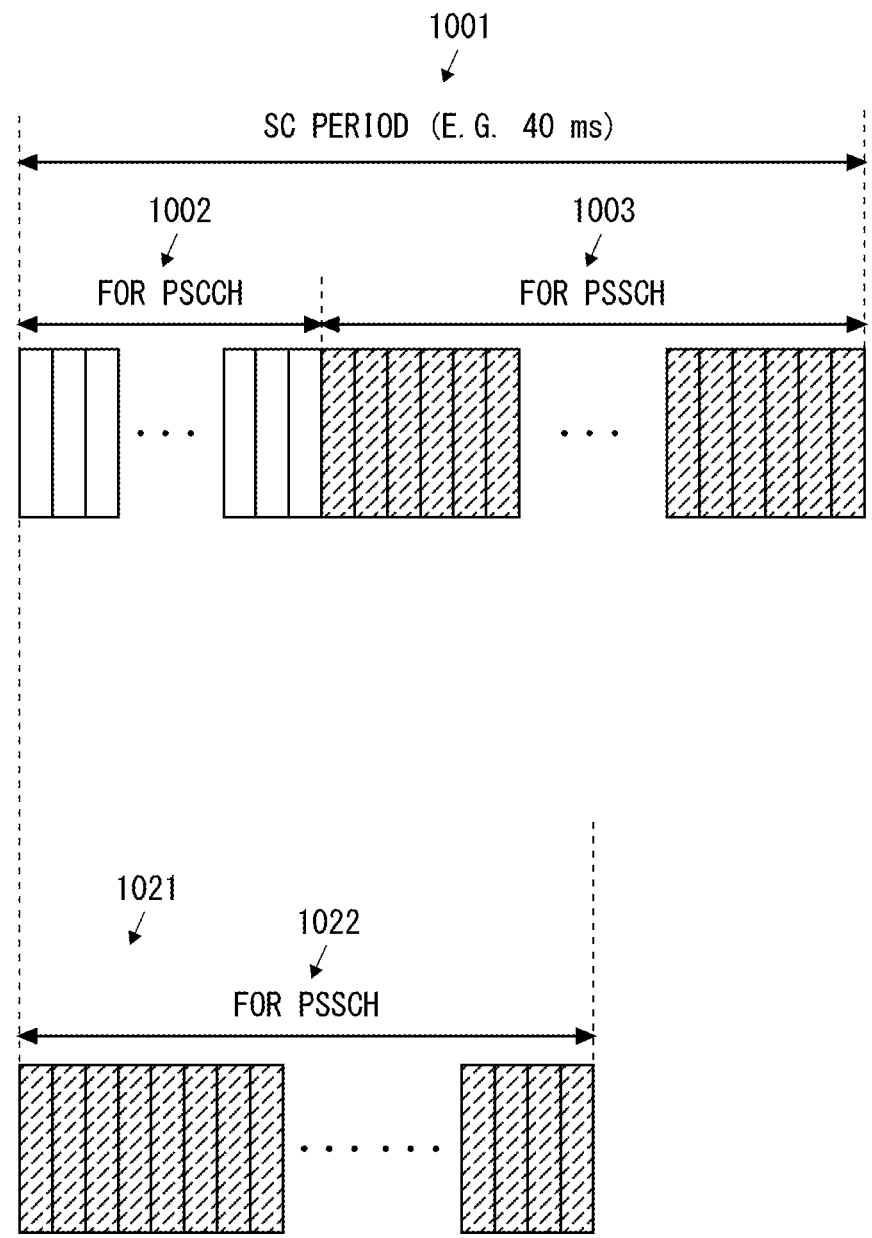
FIG. 10 is a diagram for explaining an example of a resource pattern for a low-latency mode.

In the fifth example, the second resource pattern for the low-latency mode does not include the PSCCH subframe pool. FIG. 10 shows a pattern 1001 that is a specific example of the first resource pattern used in the normal mode, and a pattern 1021 that is a specific example of the second resource pattern used in the low-latency mode. The structure of the first resource pattern 1001 is similar to that of the first resource pattern 701 shown in FIG. 7. Specifically, the first resource pattern 1001 includes a PSCCH subframe pool 1002 and a PSSCH subframe pool 1003.

Although the second resource pattern 1021 includes a PSSCH subframe pool 1022 for data transmission on the sidelink, it includes no PSCCH subframe pool. The period (i.e., second time period) of the second resource pattern 1021 may be the same as or different from the sidelink control period (i.e., first time period) of the normal mode.

In some implementations, the eNB 2 configures the receiving terminal (UE 1B) with the PSSCH subframe pool 1022. The configuration of the PSSCH subframe pool 1022 for the receiving terminal (UE 1B) may be included in a control signal (e.g., RRC signaling) indicating that the low-latency mode is to be activated. Meanwhile, the transmitting terminal (UE 1A) transmits a Sidelink BSR to the eNB 2 in response to an occurrence of data to be transmitted on the sidelink, and receives a sidelink grant (SL grant) from the eNB 2. The sidelink grant indicates a PSCCH resource for transmitting scheduling assignment information (i.e., SCI format 0) and PSSCH resources for data transmission. Note that, the eNB 2 selects these PSCCH and PSSCH resources from the PSSCH subframe pool 1022 that has been configured in the receiving terminal (UE 1B).

In order to indicate a set of PSSCH subframes to be allocated to the UEs 1A and 1B from the PSSCH subframe pool 1022, the eNB 2 may use a bitmap similar to the Time Resource Pattern (TRP) index. The length of this bitmap may be the same as or shorter than that of the PSSCH subframe pool 1022. For example, the bitmap indicates that subframes corresponding to bits set to a value "1" are available for PSSCH transmission, while subframes corresponding to bits set to a value "0" are unavailable for the PSSCH transmission.

The transmitting terminal (UE 1A) may include an "offset value" for designating PSSCH resources for data transmission in the scheduling assignment information (i.e., SCI format 0) to be transmitted to the receiving terminal (UE 1B). This offset value may indicate an offset from the subframe index of the subframe in which the scheduling assignment information (i.e., SCI format 0) is transmitted. In other words, the offset value may indicate the number of subframes between the subframe in which the scheduling assignment information (i.e., SCI format 0) is transmitted and the first subframe in the set of PSSCH subframes.

According to these operations performed by the UEs 1A and 1B and the eNB 2, the receiving terminal (UE 1B) needs to attempt a receiving operation only in the PSSCH subframe pool 1022 configured by the eNB 2, and thus does not need to always attempt a receiving operation in the whole sidelink bandwidth. This contributes to reducing power consumption of the receiving terminal (UE 1B).

Further, the eNB 2 may indicate, to the receiving terminal (UE 1B), a part of the whole frequency bandwidth of the PSSCH subframe pool 1022 in which the receiving terminal (UE 1B) should attempt receiving operations. The configuration for the receiving terminal (UE 1B) to indicate this part of the whole frequency bandwidth may be included in a control signal (e.g., RRC signaling) indicating that the low-latency mode is activated. Meanwhile, the transmitting terminal (UE 1A) may transmit a Sidelink BSR to the eNB 2 in response to an occurrence of data to be transmitted on the sidelink, and receive a sidelink grant (SL grant) indicating sidelink transmission resources from the eNB 2. The eNB 2 may select the sidelink transmission resources from the part of the frequency bandwidth that have been configured in the receiving terminal (UE 1B). According to these operations performed by the UEs 1A and 1B and the eNB 2, it is possible to further limit the bandwidth in which the receiving terminal (UE 1B) attempts a receiving operation. It is thus possible to further reduce the power consumption of the receiving terminal (UE 1B).

In other implementations, the eNB 2 may pre-configure the transmitting terminal (UE 1A) and the receiving terminal (UE 1B) with PSSCH resources selected from the PSSCH subframe pool 1022 for data transmission from the transmitting terminal (UE 1A) to the receiving terminal (UE 1B), using RRC signaling (e.g., RRC Connection Reconfiguration message). The time interval between PSSCH resources, which are selected from the subframe pool 1022 and allocated to the UEs 1A and 1B, may be set to a length equal to or shorter than the length of the permissible delay for low-latency applications. In this way, the transmitting terminal (UE 1A) can lower the transmission delay from when data to be transmitted on the sidelink occurs to when the transmitting terminal (UE 1A) transmits this data to or below the permissible delay. Further, according to these operations performed by the UEs 1A and 1B and the eNB 2, the receiving terminal (UE 1B) needs to attempt a receiving operation only in specific PSSCH resources configured by the eNB 2, and thus does not need to attempt a receiving operation in the whole bandwidth of the PSSCH subframe pool 1022. This contributes to reducing power consumption of the receiving terminal (UE 1B).

In order to indicate a set of subframes to be allocated to the UEs 1A and 1B from the PSSCH subframe pool 1022, the eNB 2 may use a bitmap similar to the Time Resource Pattern (TRP) index. The length of this bitmap may be the same as or shorter than that of the PSSCH subframe pool 1022. For example, the bitmap indicates that subframes corresponding to bits set to a value "1" are available for PSSCH transmission, while subframes corresponding to bits set to a value "0" are unavailable for the PSSCH transmission.

Example 6

Figure 11:
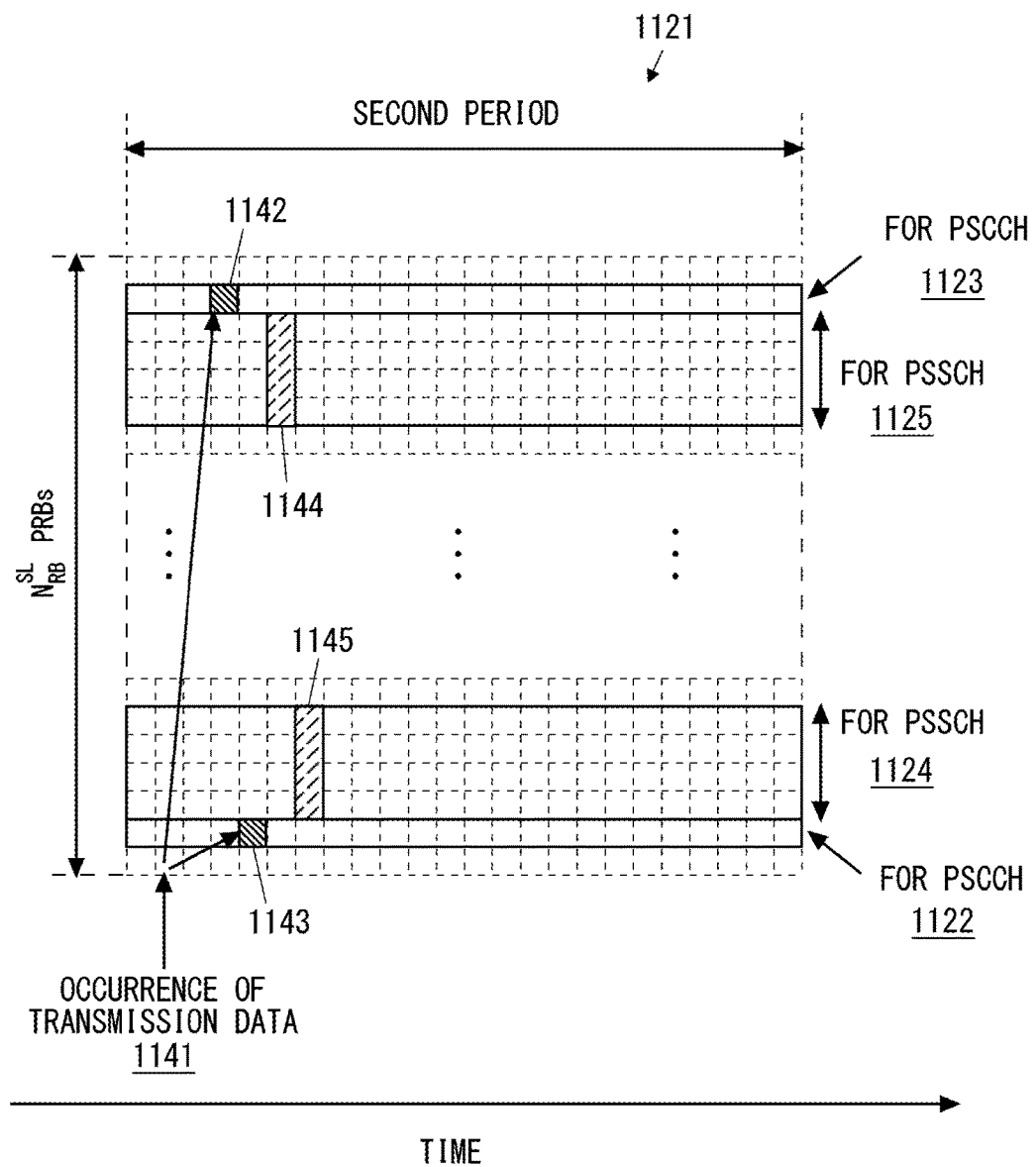
FIG. 11 is a diagram for explaining an example of a resource pattern for a low-latency mode.

The sixth example shows a modification of the above-described fifth example. As shown in FIG. 11, in the sixth example, the second resource pattern 1121 for the low-latency mode includes PSCCH subframe pools 1122 and 1123 that are configured to be located continuously over the second time period. The PSCCH subframe pools 1122 and 1123 can be specified only by frequency resources for PSCCH. Specifically, the PSCCH subframe pools 1122 and 1123 each can be defined by a resource block pool for PSCCH. Accordingly, the PSCCH subframe pools 1122 and 1123 can also be referred to as PSCCH bandwidth.

In the example shown in FIG. 11, the eNB 2 configures the receiving terminal (UE 1B) with the PSCCH subframe pools 1122 and 1123. The configuration of the PSCCH subframe pools 1122 and 1123 may be included in a control signal (e.g., RRC signaling) indicating that the low-latency mode is activated.

Meanwhile, in response to an occurrence of data that should be transmitted on the sidelink, the transmitting terminal (UE 1A) may transmit a Sidelink BSR to the eNB 2 to request sidelink resources, and receive from the eNB 2 a sidelink grant (SL grant) indicating sidelink transmission resources selected from PSSCH subframe pools 1124 and 1125. Alternatively, the eNB 2 may pre-configure, via RRC signaling (e.g., RRC Connection Reconfiguration message), the transmitting terminal (UE 1A) with PSSCH resources available for data transmission to be performed by the transmitting terminal (UE 1A).

In the example shown in FIG. 11, data transmission from the transmitting terminal (UE 1A) to the receiving terminal (UE 1B) is performed as follows. In response to an occurrence of transmission data (1141), the transmitting terminal (UE 1A) transmits scheduling assignment information (i.e., SCI format 0) on the PSCCH (1142 and 1143). The scheduling assignment information 1142 and 1143 indicate PSSCH resources 1144 and 1145 for data transmission. As described above, the transmitting terminal (UE 1A) may transmit a Sidelink BSR to the eNB 2 to request sidelink resources in response to an occurrence of transmission data (1141), and receive a sidelink grant (SL grant) indicating allocation of the PSSCH resources 1144 and 1145 from the eNB 2. Alternatively, the transmitting terminal (UE 1A) may autonomously select the PSSCH resources 1144 and 1145 from the PSSCH subframe pools 1124 and 1125 which have been pre-configured by the eNB 2.

The receiving terminal (UE 1B) performs a receiving operation (i.e., blind decoding) on the PSCCH subframe pools 1122 and 1123. Then, in response to successful decoding of the scheduling assignment information 1142 and 1143 addressed to the receiving terminal (UE 1B) itself, the receiving terminal (UE 1B) receives data from the transmitting terminal (UE 1A) in the PSSCH resources 1144 and 1145 in accordance with the scheduling assignment information 1142 and 1143.

Note that, in the example shown in FIG. 11, the transmitting terminal (UE 1A) can transmit the PSCCH carrying the scheduling assignment information 1142 and 1143 in an arbitrary subframe. The transmitting terminal (UE 1A) thus may not need to designate a set of PSSCH subframes for data transmission. In such a case, the scheduling assignment information 1142 and 1143 may not contain the Time Resource Pattern (TRP) index.

According to the sixth example, the receiving terminal (UE 1B) needs to continuously attempt receiving operations only in the PSCCH subframe pools 1122 and 1123 configured by the eNB 2, and thus does not need to always attempt receiving operations in the whole sidelink bandwidth. This contributes to reducing power consumption of the receiving terminal (UE 1B).

As understood from the above descriptions, in this embodiment, the eNB 2 transmits, to at least one of the UEs 1A and 1B, a control signal indicating which of the normal mode and the low-latency mode is to be activated for D2D communication (i.e., sidelink transmission) between the UEs 1A and 1B. Further, when the low-latency mode is activated by the eNB 2, the UEs 1A and 1B perform data transmission on the sidelink in accordance with the low-latency mode. The UEs 1A and 1B and the eNB 2 according to this embodiment thus can contribute to facilitating applying D2D communication to a communication service requiring a low latency.

Second Embodiment

This embodiment provides a modified example of the control procedure for sidelink transmission described in the first embodiment. In this embodiment, a configuration example of a radio communication system is similar to that shown in FIG. 4. In this embodiment, in response to receiving from the transmitting terminal (UE 1A) or the receiving terminal (UE 1B) a request for activation of the low-latency mode, the eNB 2 transmits a control signal indicating activation of the low-latency mode to the transmitting terminal (UE 1A) or the receiving terminal (UE 1B) or both.

Figure 12:
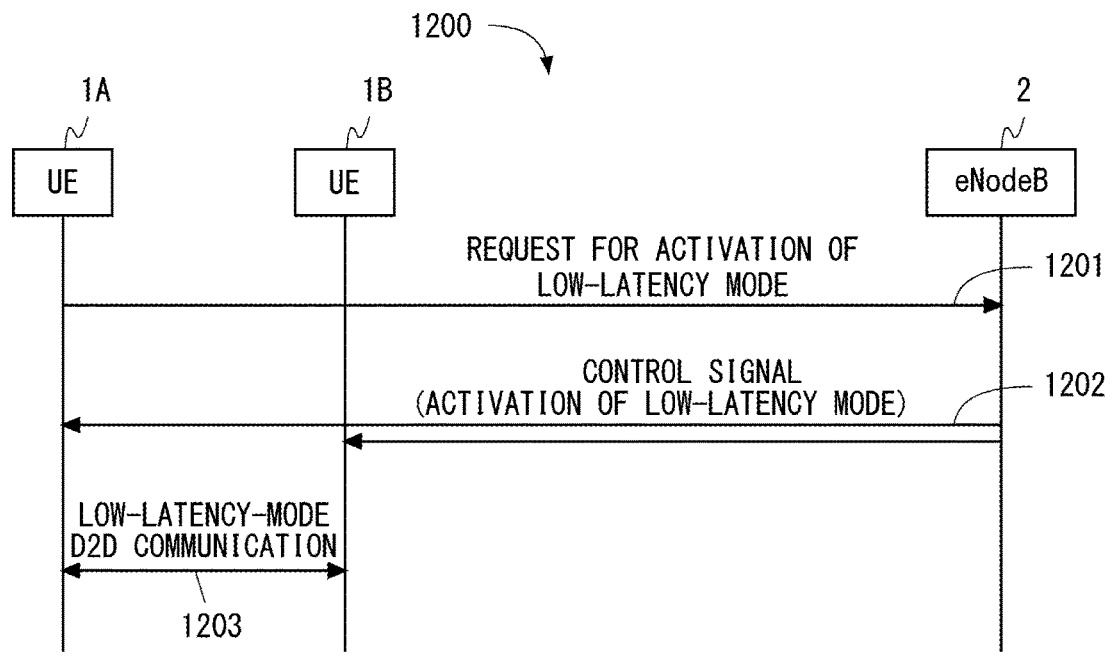
FIG. 12 is a sequence diagram showing an example of operations performed by a base station, a transmitting terminal, and a receiving terminal according to a second embodiment.

FIG. 12 is a sequence diagram showing a process 1200, which is an example of operations performed by the UEs 1A and 1B and the eNB 2. In Step 1201, the transmitting terminal (UE 1A) transmits a request signal indicating that the low-latency mode is required (i.e., a request for activation of the low-latency mode) to the eNB 2. In some implementations, the transmitting terminal (UE 1A) may transmit this request signal in response to autonomously determining that low-latency mode is required.

For example, assume that the UEs 1A and 1B are implemented in vehicles and are used for V2V applications. In this case, when a plurality of vehicles, including vehicles equipped with the UEs 1A and 1B, need to perform platooning in cooperation with each other, the transmitting terminal (UE 1A) may transmit to the eNB 2 the request signal indicating that the low-latency mode is required. In the platooning, to maintain the following distance between respective vehicles, each vehicle has to accelerate and brake more frequently than in the normal traveling, and thus needs to perform frequent and low-latency V2V communication to agree to acceleration and deceleration of preceding and following vehicles. Further, for example, when it is presumed that the traveling speed of the UE 1A or the relative speed between the UE 1A and an oncoming vehicle (the receiving terminal, the UE 1B) is equal to or higher than a predetermined value (e.g., when the UE 1A is traveling on an expressway), the transmitting terminal (UE 1A) may transmit to the eNB 2 the request signal indicating that the low-latency mode is required. When the relative speed between the UE 1A and the oncoming vehicle is high, the time during which the transmitting terminal (UE 1A) and the oncoming vehicle (the receiving terminal, the UE 1B) can communicate with each other is relatively short. They thus need to perform low-latency V2V communication.

In Step 1202, in response to the request from the transmitting terminal (UE 1A), the eNB 2 transmits a control signal indicating activation of the low-latency mode to the transmitting terminal (UE 1A) and the receiving terminal (UE 1B). In Step 1203, the transmitting terminal (UE 1A) and the receiving terminal (UE 1B) perform sidelink communication (i.e., D2D communication) in the low-latency mode.

Note that, in Step 1202, the eNB 2 may transmit the control signal to only one of the transmitting terminal (UE 1A) and the receiving terminal (UE 1B). In this case, the one of the terminals that has received the control signal (e.g., the UE 1A) may inform the other terminal (e.g., the UE 1B) about activation of the low-latency mode on the sidelink.

As described in the first embodiment, in the case of the scheduled resource allocation (i.e., sidelink transmission mode 1), the control signal in Step 1202 may be RRC signaling or a sidelink scheduling grant (DCI format 5). In the case of the autonomous resource selection (i.e., sidelink transmission mode 2), the control signal in Step 1202 may be SIB 18 or RRC signaling. The control signal in Step 1202 may include an indication indicating activation of the low-latency mode and include persistent resource allocation for sidelink transmission in the low-latency mode.

Figure 13:
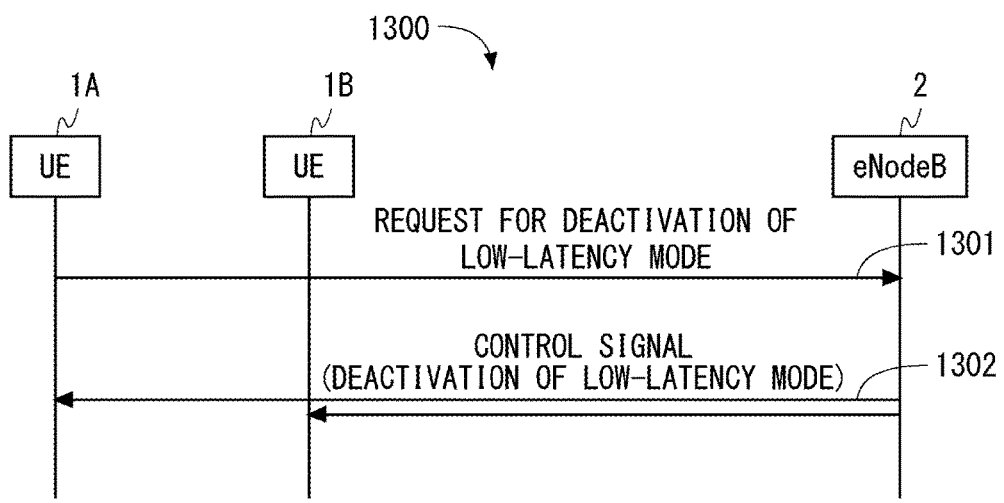
FIG. 13 is a sequence diagram showing an example of operations performed by a base station, a transmitting terminal, and a receiving terminal according to the second embodiment.

Further, as shown in FIG. 13, when the communication in the low-latency mode is finished, the transmitting terminal (UE 1A) or the receiving terminal (UE 1B) may request the eNB 2 to deactivate the low-latency mode (or to switch from the low-latency mode to the normal mode). FIG. 13 is a sequence diagram showing a process 1300, which is an example of operations performed by the UEs 1A and 1B and the eNB 2. In Step 1301, the transmitting terminal (UE 1A) transmits a request signal indicating that the low-latency mode is not required (i.e., a request for deactivation of the low-latency mode) to the eNB 2. In Step 1302, in response to the request from the transmitting terminal (UE 1A), the eNB 2 transmits a control signal indicating deactivation of the low-latency mode to the transmitting terminal (UE 1A) and the receiving terminal (UE 1B). The eNB 2 may transmit the control signal in Step 1302 to only one of the transmitting terminal (UE 1A) and the receiving terminal (UE 1B). In this case, the one of the terminals that has received the control signal (e.g., the UE 1A) may inform the other terminal (e.g., the UE 1B) about deactivation of the low-latency mode on the sidelink.

According to this embodiment, the eNB 2 can activate sidelink communication in the low-latency mode for the UEs 1A and 1B in response to a request from the UE 1A or the UE 1B.

Third Embodiment

This embodiment provides a modified example of the control procedure for sidelink transmission described in the first embodiment. In this embodiment, a configuration example of a radio communication system is similar to that shown in FIG. 4. In this embodiment, in response to receiving from an upper network a request for activation of the low-latency mode, the eNB 2 transmits a control signal indicating activation of the low-latency mode to the transmitting terminal (UE 1A) or the receiving terminal (UE 1B) or both.

The upper network may be, for example, a control node (e.g., Mobility Management Entity (MME)) in a core network, a ProSe function, or an application server. The control node (e.g., MME) in the core network communicates with a subscriber server (e.g., Home Subscriber Server (HSS)) and performs mobility management, session management (bearer management), and the like for the UEs 1A and 1B. The ProSe function communicates with ProSe-enabled UEs including the UEs 1A and 1B through a Public Land Mobile Network (PLMN) and assists ProSe discovery and ProSe direct communication. The functionality provided by the ProSe function includes, for example, (a) communication with third-party applications (e.g., ProSe Application Server), (b) authentication of a UE for ProSe discovery and ProSe direct communication, and (c) transmission of configuration information for ProSe discovery and ProSe direct communication (e.g., EPC-ProSe-User ID etc.) to a UE. The application server communicates with the UE 1A or the UE 1B or both on the application layer through the eNB 2 and the core network. The application server may be a server (e.g., Traffic Safety Server (TSS) or Intelligent Transport Systems (ITS) server) related to low-latency applications (e.g., V2V and V2I).

Figure 14:
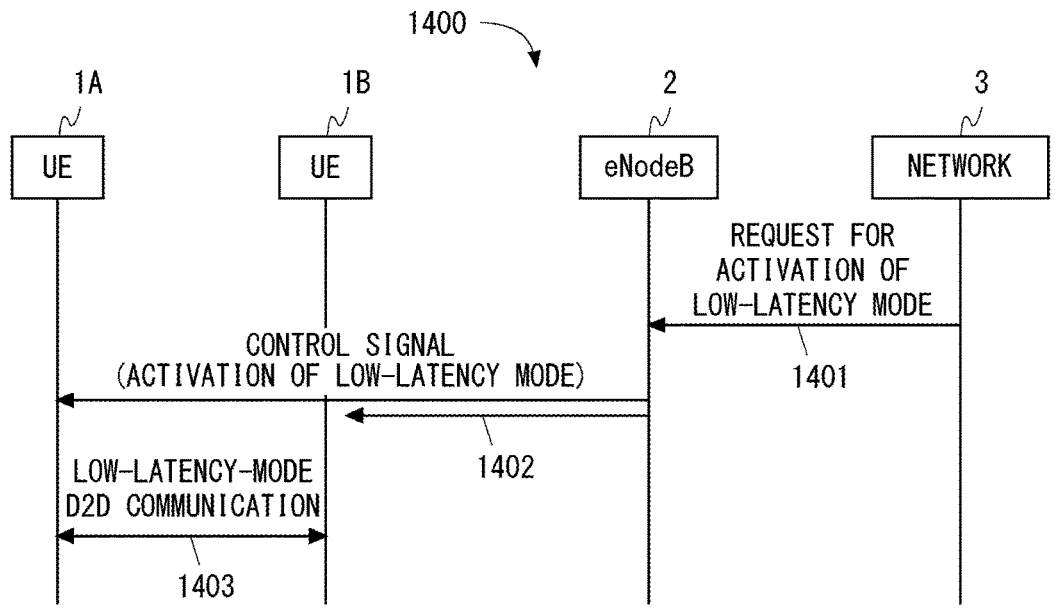
FIG. 14 is a sequence diagram showing an example of operations performed by a base station, a transmitting terminal, and a receiving terminal according to a third embodiment.

FIG. 14 is a sequence diagram showing a process 1400, which is an example of operations performed by the UEs 1A and 1B, the eNB 2, and an upper network 3. In Step 1401, the upper network 3 transmits a request signal indicating that the low-latency mode is required for at least one of the UEs 1A and 1B (i.e., a request for activation of the low-latency mode) to the eNB 2. In Step 1402, in response to the request from the upper network 3, the eNB 2 transmits a control signal indicating activation of the low-latency mode to the transmitting terminal (UE 1A) and the receiving terminal (UE 1B). In Step 1403, the transmitting terminal (UE 1A)

and the receiving terminal (UE 1B) perform sidelink communication (i.e., D2D communication) in the low-latency mode.

In Step 1402, the eNB 2 may transmit the control signal to only one of the transmitting terminal (UE 1A) and the receiving terminal (UE 1B). In this case, one of the terminals that has received the control signal (e.g., the UE 1A) may inform the other terminal (e.g., the UE 1B) about activation of the low-latency mode on the sidelink.

Figure 15:
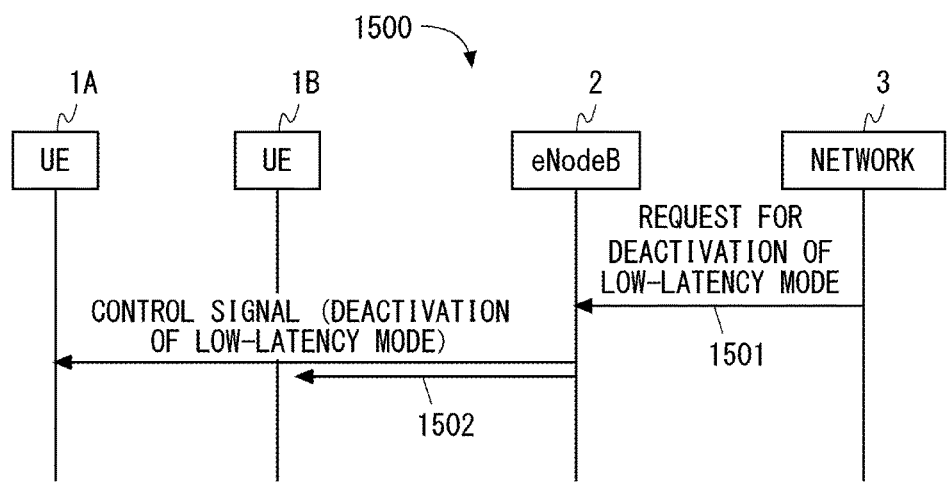
FIG. 15 is a sequence diagram showing an example of operations performed by a base station, a transmitting terminal, and a receiving terminal according to the third embodiment.

Further, as shown in FIG. 15, when the communication in the low-latency mode is finished, the upper network 3 may request the eNB 2 to deactivate the low-latency mode (or to switch from the low-latency mode to the normal mode). FIG. 15 is a sequence diagram showing a process 1500, which is an example of operations performed by the UEs 1A and 1B, the eNB 2, and the upper network 3. In Step 1501, the upper network 3 transmits a request signal indicating that the low-latency mode is not required (i.e., a request for deactivation of the low-latency mode) to the eNB 2. In Step 1502, in response to the request from the upper network 3, the eNB 2 transmits a control signal indicating deactivation of the low-latency mode to the transmitting terminal (UE 1A) and the receiving terminal (UE 1B). The eNB 2 may transmit the control signal in Step 1502 to only one of the transmitting terminal (UE 1A) and the receiving terminal (UE 1B). In this case, one of the terminals that has received the control signal (e.g., the UE 1A) may inform the other terminal (e.g., the UE 1B) about deactivation of the low-latency mode on the sidelink.

According to this embodiment, the eNB 2 can activate sidelink communication in the low-latency mode for the UEs 1A and 1B in response to a request from the upper network.

Fourth Embodiment

This embodiment provides a modified example of the control procedure for sidelink transmission described in the first embodiment. In this embodiment, a configuration example of a radio communication system is similar to that shown in FIG. 4. In this embodiment, the eNB 2 autonomously determines whether the low-latency mode needs to be activated. When the eNB 2 autonomously determines that the low-latency mode is required, the eNB 2 transmits a control signal indicating activation of the low-latency mode to the transmitting terminal (UE 1A) or the receiving terminal (UE 1B) or both. When the eNB 2 autonomously determines that the low-latency mode is not required, the eNB 2 transmits a control signal indicating deactivation of the low-latency mode to the transmitting terminal (UE 1A) or the receiving terminal (UE 1B) or both.

In some implementations, the eNB 2 may permit the UEs 1A and 1B to perform sidelink communication in the low-latency mode when the UEs 1A and 1B are located in a specific geographic area. The specific geographic area may be associated with a specific cell. Specifically, the eNB 2 may permit the UEs 1A and 1B to perform sidelink communication in the low-latency mode when the UEs 1A and 1B are located in a specific cell provided by the eNB 2 itself. In this case, the eNB 2 may broadcast or multicast the control signal, which indicates that the low-latency mode is permitted, on a channel that can be received by a plurality of UEs 1 located in the specific cell. The use of broadcasting or multicasting can contribute to a reduction in the number of control messages (i.e., a signaling load) compared to the case where the low-latency mode is configured for each UE 1 by individual RRC signaling.

Figure 16:
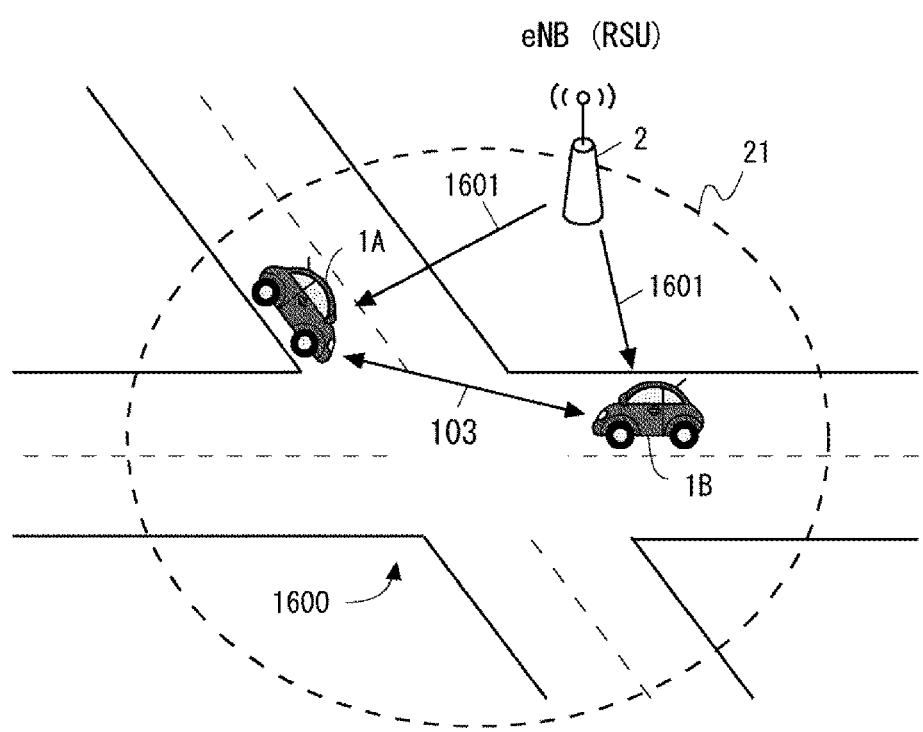
FIG. 16 is a diagram showing a configuration example of a radio communication system according to a fourth embodiment.

As shown in FIG. 16, in some implementations, the eNB 2 may have functions of a Road Side Unit (RSU). The RSU is an entity installed at the roadside and supports V2I services including transmission and reception to and from vehicle UEs (e.g., UEs 1A and 1B) using a V2I application. In the example shown in FIG. 16, the eNB 2, which severs as the RSU, is installed near an intersection 1600. A cell 21 provided by the eNB 2 covers a geographic area including the intersection 1600.

In the configuration shown in FIG. 16, the eNB 2, which severs as the RSU, may transmit a control signal 1601 indicating activation of the low-latency mode to the UEs 1A and 1B in response to a handover of the UEs 1A and 1B to the cell 21.

Alternatively, the eNB 2, which serves as the RSU, may detect an occurrence of an event (e.g., an accident) such as a traffic accident or a traffic jam near the intersection 1600 and, in response to this occurrence of the event, transmit a control signal 1601 indicating activation of the low-latency mode to the UEs 1A and 1B.

According to this embodiment, the eNB 2 can autonomously activate sidelink communication in the low-latency mode for the UEs 1A and 1B.

Fifth Embodiment

Figure 17:
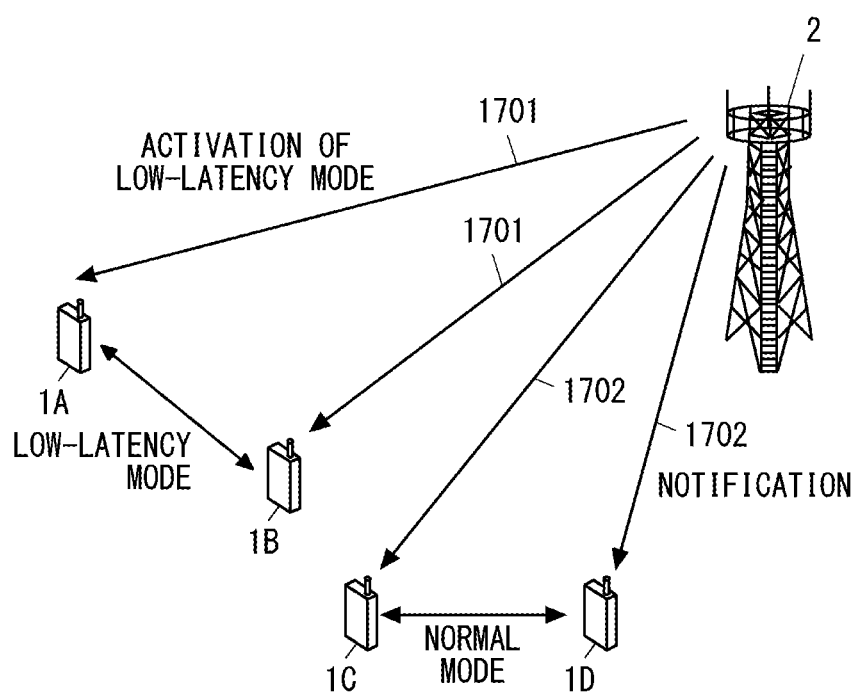
FIG. 17 is a diagram showing an example of an operation of a base station according to a fifth embodiment.

This embodiment provides a modified example of the control procedure for sidelink transmission described in the first to fourth embodiments. FIG. 17 is a diagram showing a configuration example of a radio communication system according to this embodiment. Similarly to the above-described first to fourth embodiments, the eNB 2 transmits a control signal 1701 indicating activation of the low-latency mode to the UE 1A or the UE 1B or both. Further, the eNB 2 in this embodiment transmits, to either or both of other radio terminals 1C and 1D that are performing sidelink communication in the normal mode, a notification signal (or a message) 1702 indicating that sidelink communication in accordance with the low-latency mode is being performed in their vicinity.

In some implementations, the notification signal 1702 may indicate that use of a specific radio resource A for the low-latency mode (e.g., a subframe pool or a resource block pool or both) is prohibited. Alternatively, the notification signal 1702 may indicate that use of a radio resource B different from the specific radio resource A for the low-latency mode is permitted.

According to this embodiment, it is possible to prevent quality of sidelink transmission in the low-latency mode from deteriorating due to interference from the normal mode to the low-latency mode.

Sixth Embodiment

Figure 18:
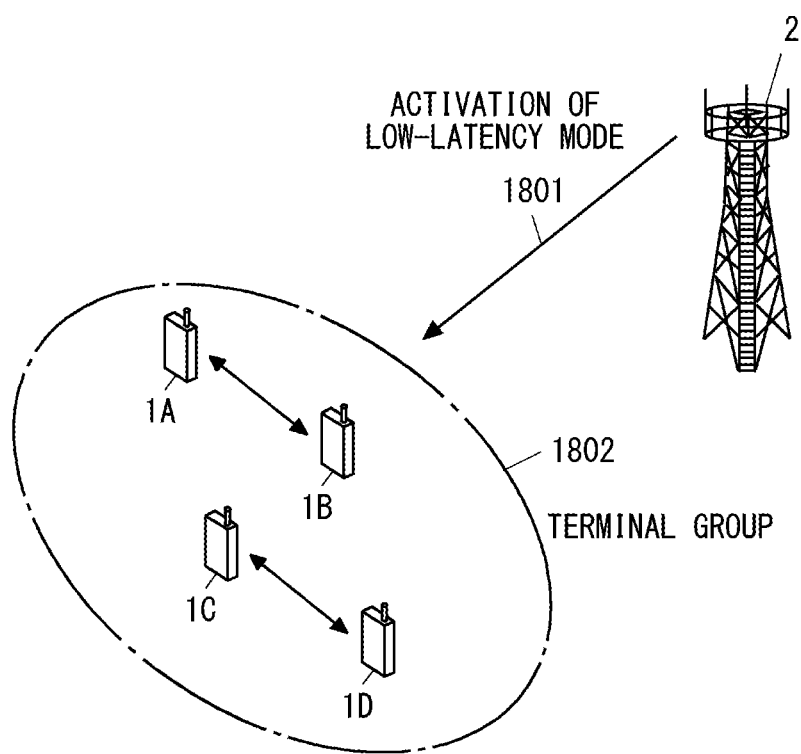
FIG. 18 is a diagram showing an example of an operation of a base station according to a sixth embodiment.

This embodiment provides a modified example of the control procedure for sidelink transmission described in the first to fifth embodiments. FIG. 18 is a diagram showing a configuration example of a radio communication system according to this embodiment. The eNB 2 in this embodiment transmits, to a UE group 1802, a control signal 1801 indicating which of the normal mode and the low-latency mode is to be activated. The UE group 1802 includes UEs 1A and 1B, and one or a plurality of other UEs 1 (e.g., UEs 1C and 1D).

The eNB 2 transmits a control signal 1801 so that at least three UEs 1 in the UE group 1802 can receive the control signal 1801. The eNB 2 may broadcast or multicast the control signal 1801.

Specifically, the control signal 1801 may be transmitted on a data radio bearer for carrying Multimedia Broadcast/Multicast Service (MBMS) data, i.e., on an MBMS Radio Bearer (MRB) or a Point-to-Multipoint (PTM) Radio Bearer. Alternatively, the control signal 1801 may be transmitted on a Broadcast Control Channel (BCCH) carrying a System Information Block (SIB).

This embodiment contributes to a reduction in the number of control messages (i.e., a signaling load) compared to the case where the low-latency mode is configured for each UE 1 by individual RRC signaling.

Figure 19:
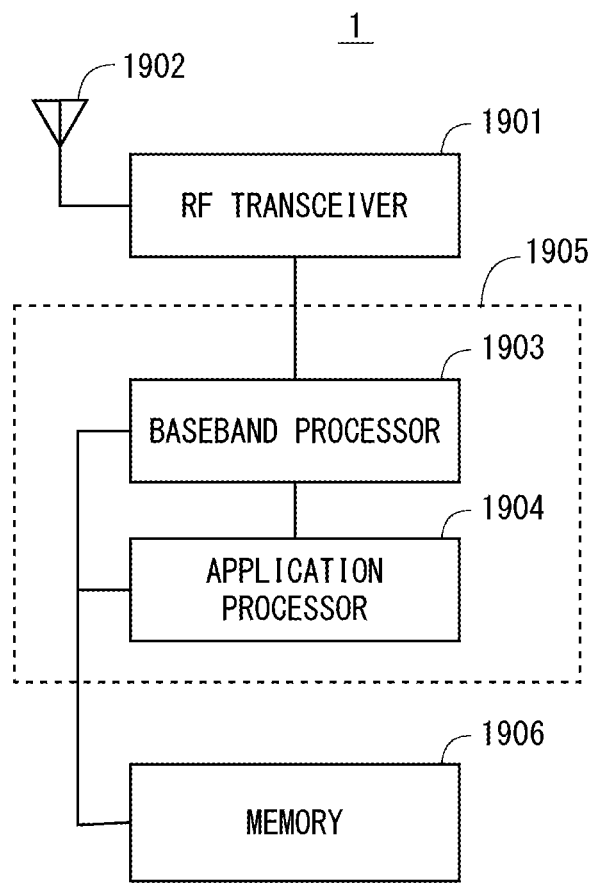
FIG. 19 is a block diagram showing a configuration example of a radio terminal according to some embodiments.

Lastly, configuration examples of the UE 1 and the eNB 2 according to the above-described embodiments will be described. FIG. 19 is a block diagram showing a configuration example of the UE 1. The UE 1 as the transmitting terminal and the UE 1 as the receiving terminal described above may have the configuration shown in FIG. 19. A Radio Frequency (RF) transceiver 1901 performs analog RF signal processing for communication with the eNB 2. The analog RF signal processing performed by the RF transceiver 1901 includes frequency up-conversion, frequency down-conversion, and amplification. The RF transceiver 1901 is connected to an antenna 1902 and a baseband processor 1903. Specifically, the RF transceiver 1901 receives modulated symbol data (or OFDM symbol data) from the baseband processor 1903, generates a transmission RF signal and supplies the transmission RF signal to the antenna 1902. Further, the RF transceiver 1901 generates a baseband received signal based on a received RF signal received by the antenna 1902 and supplies it to the baseband processor 1903.

The baseband processor 1903 performs digital baseband signal processing (i.e., data-plane processing) and control-plane processing for wireless communication. The digital baseband signal processing includes (a) data compression/decompression, (b) data segmentation/concatenation, (c) composition/decomposition of a transmission format (i.e., transmission frame), (d) channel encoding/decoding, (e) modulation (i.e., symbol mapping)/demodulation, and (f) OFDM symbol data (baseband OFDM signal) generation by Inverse Fast Fourier Transform (IFFT). On the other hand, the control-plane processing includes communication management of Layer 1 (e.g., transmission power control), Layer 2 (e.g., radio resource management and hybrid automatic repeat request (HARQ) processing), and Layer 3 (e.g., signaling regarding attach, mobility, and call management).

For example, in the case of LTE and LTE-Advanced, the digital baseband signal processing performed by the baseband processor 1903 may include signal processing of Packet Data Convergence Protocol (PDCP) layer, Radio Link Control (RLC) layer, MAC layer, and PHY layer. Further, the control-plane processing performed by the baseband processor 1903 may include processing of Non-Access Stratum (NAS) protocol, RRC protocol, and MAC CE.

The baseband processor 1903 may include a modem processor (e.g., Digital Signal Processor (DSP)) that performs digital baseband signal processing and a protocol stack processor (e.g., Central Processing Unit (CPU) or Micro Processing Unit (MPU)) that performs control plane processing. In this case, the protocol stack processor that performs control plane processing may be made common to an application processor 1904, which is described below.

The application processor 1904 is also referred to as a CPU, an MPU, a microprocessor or a processor core. The application processor 1904 may include a plurality of processors (a plurality of processor cores). The application processor 1904 loads a system software program (Operating System (OS)) and various application programs (e.g., voice call application, WEB browser, mailer, camera operation application, and music player application) from a memory 1906 or from another memory (not shown) and executes these programs, thereby providing various functions of the UE 1.

In some implementations, as represented by a dashed line (1905) in FIG. 19, the baseband processor 1903 and the application processor 1904 may be integrated on a single chip. In other words, the baseband processor 1903 and the application processor 1904 may be implemented in a single System on Chip (SoC) device 1905. A SoC device may be referred to as a system Large Scale Integration (LSI) or a chipset.

The memory 1906 is a volatile memory, a nonvolatile memory, or a combination thereof. The memory 1906 may include a plurality of memory devices that are physically independent from each other. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 1906 may include, for example, an external memory device that can be accessed by the baseband processor 1903, the application processor 1904, and the SoC 1905. The memory 1906 may include an internal memory device that is integrated in the baseband processor 1903, the application processor 1904, or the SoC 1905. Further, the memory 1906 may include a memory in a Universal Integrated Circuit Card (UICC).

The memory 1906 may store software module(s) (a computer program(s)) including instructions and data to perform processing by the UE 1 described in the above embodiments. In some implementations, the baseband processor 1903 or the application processor 1904 may be configured to load the software module(s) from the memory 1906 and execute the loaded software module(s), thereby performing the processing of the UE 1 described in the above embodiments.

Figure 20:
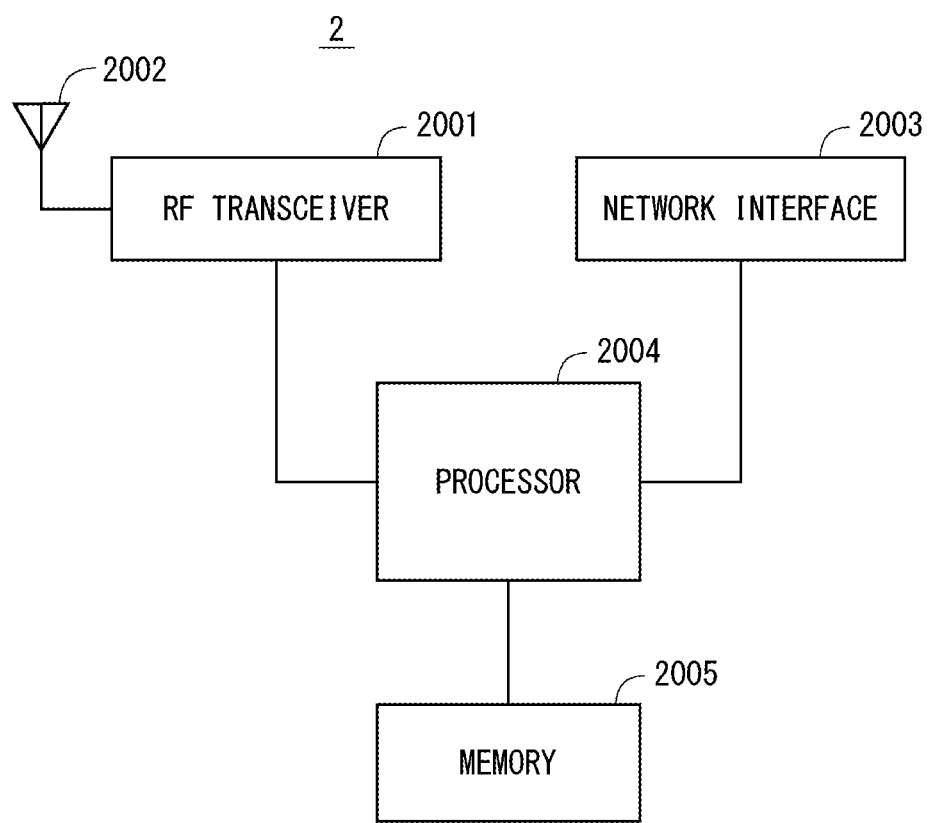
FIG. 20 is a block diagram showing a configuration example of a base station according to some embodiments.

FIG. 20 is a block diagram showing a configuration example of the base station (eNB) 2 according to the above-described embodiments. Referring to FIG. 20, the eNB 2 includes an RF transceiver 2001, a network interface 2003, a processor 2004, and a memory 2005. The RF transceiver 2001 performs analog RF signal processing for communication with the wireless terminal 1. The RF transceiver 2001 may include a plurality of transceivers. The RF transceiver 2001 is connected to an antenna 2002 and a processor 2004. The RF transceiver 2001 receives modulated symbol data (or OFDM symbol data) from the processor 2004, generates a transmission RF signal and supplies the transmission RF signal to the antenna 2002. Further, the RF transceiver 2001 generates a baseband received signal based on a received RF signal received by the antenna 2002 and supplies it to the processor 2004.

The network interface 2003 is used to communicate with a network node (e.g., Mobility Management Entity (MME) and Serving Gateway (S-GW)). The network interface 2003 may include, for example, a network interface card (NIC) conforming to the IEEE 802.3 series.

The processor 2004 performs digital baseband signal processing (i.e., data-plane processing) and control-plane processing for wireless communication. For example, in the case of LTE and LTE-Advanced, the digital baseband signal processing performed by the processor 2004 may include signal processing of the PDCP layer, RLC layer, MAC layer and PHY layer. Further, the control-plane processing by the processor 2004 may include processing of S1 protocol, RRC protocol and MAC CE.

The processor 2004 may include a plurality of processors. For example, the processor 2004 may include a modem processor (e.g., DSP) that performs the digital baseband signal processing and a protocol stack processor (e.g., CPU or MPU) that performs the control-plane processing.

The memory 2005 is a combination of a volatile memory and a nonvolatile memory. The volatile memory is, for example, an SRAM, a DRAM, or a combination thereof. The nonvolatile memory is, for example, an MROM, a PROM, a flash memory, a hard disk drive, or any combination thereof. The memory 2005 may include a storage that is placed apart from the processor 2004. In this case, the processor 2004 may access the memory 2005 through the network interface 2003 or an I/O interface (not shown).

The memory 2005 may store a software module(s) (computer program(s)) including instructions and data to perform processing by the eNB 2 described in the above described plurality of embodiments. In some implementations, the processor 2004 may be configured to load the software module(s) from the memory 2005 and execute the loaded software module(s), thereby performing the processing of the eNB 2 described in the above described embodiments.

As described with reference to FIGS. 19 and 20, each of the processors included in the UE 1 and the eNB 2 according to the above-described embodiments executes one or more programs including a set of instructions to cause a computer to perform an algorithm described above with reference to the drawings. These programs may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a Compact Disc Read Only Memory (CD-ROM), CD-R, CD-R/W, and a semiconductor memory (such as a mask ROM, a Programmable ROM (PROM), an Erasable PROM (EPROM), a flash ROM, and a Random Access Memory (RAM)). These programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

Other Embodiments

Each of the above embodiments may be used individually, or two or more of the embodiments may be appropriately combined with one another.

In the above-described embodiments, activation of the low-latency mode may indicate deactivation of the sidelink control period (i.e., the first time period) in the normal mode or the resource pattern used in the normal mode.

The processes and operations performed by the eNB 2 described in the above embodiments may be provided by a Digital Unit (DU) or a combination of a DU and a Radio Unit (RU) included in a Cloud Radio Access Network (C-RAN) architecture. The C-RAN is also referred to as a Centralized RAN. The DU is also referred to as a Baseband Unit (BBU). The RU is also referred to as a Remote Radio Head (RRH) or Remote Radio Equipment (RRE). That is, the processes and operations performed by the eNB 2 described in the above embodiments may be provided by one or a plurality of network apparatuses (Radio Access Network (RAN) nodes).

The above-described embodiments are not limited to LTE-Advanced and its improvements and may be applied to D2D communication in other mobile communication networks or systems.

Further, the above-described embodiments are merely examples of applications of the technical ideas obtained by the inventors. These technical ideas are not limited to the above-described embodiments and various modifications can be made thereto.

For example, the whole or part of the embodiments disclosed above can be described as, but not limited to, the following supplementary notes.

(Supplementary Note 1)

A network apparatus comprising:
a memory; and
at least one processor, wherein
the at least one processor is configured to transmit, to at least one of a D2D transmitting terminal and a D2D reception terminal, a first control signal including an indication indicating which of first and second device-to-device (D2D) transmission modes is to be activated,
the first D2D transmission mode conforms to a first resource pattern that is repeated every first time period,
each first resource pattern includes: a control channel subframe pool used to transmit, from the D2D transmitting terminal to the D2D receiving terminal, first D2D control information indicating resource allocation for data transmission; and a data channel subframe pool used for data transmission from the D2D transmitting terminal to the D2D receiving terminal in accordance with the first D2D control information,
the second D2D transmission mode conforms to a second resource pattern that is repeated every second time period, the second time period being the same as or different from the first time period,
each second resource pattern includes a data channel subframe pool used for data transmission from the D2D transmitting terminal to the D2D receiving terminal, and
each second resource pattern is defined so that:
(a) within one second resource pattern or two adjacent second resource patterns, a plurality of control channel subframe pools used for transmission of the first D2D control information appear at an interval shorter than the first time period;
(b) each second resource pattern includes a control channel subframe pool used to transmit second D2D control information indicating resource allocation for data transmission performed in a plurality of consecutive second time periods; or
(c) each second resource pattern does not include a control channel subframe pool used for transmission of the first or second D2D control information.

(Supplementary Note 2)

The network apparatus described in Supplementary note 1, wherein the at least one processor is configured to, when the second D2D transmission mode is activated, notify at least one of the D2D transmitting terminal and the D2D receiving terminal of persistent resource allocation that is valid over a plurality of second resource patterns.

(Supplementary Note 3)

The network apparatus described in Supplementary note 2, wherein the first control signal for activating the second D2D transmission mode is a D2D grant message including both the indication and the persistent resource allocation, and the at least one processor is configured to transmit the D2D grant message to the D2D transmitting terminal.

(Supplementary Note 4)

The network apparatus described in Supplementary note 2, wherein the first control signal for activating the second D2D transmission mode is a Radio Resource Control (RRC) message including both the indication and the persistent resource allocation, and the at least one processor is configured to transmit the RRC message to the D2D transmitting terminal and the D2D receiving terminal.

(Supplementary Note 5)

The network apparatus described in any one of Supplementary notes 2 to 4, wherein each second resource pattern does not include the control channel subframe pool.

(Supplementary Note 6)

The network apparatus described in Supplementary note 1, wherein the second time period is shorter than the first time period.

(Supplementary Note 7)

The network apparatus described in any one of Supplementary notes 1 to 6, wherein the first control signal for activating the second D2D transmission mode indicates deactivation of the first time period or the first resource pattern.

(Supplementary Note 8)

The network apparatus described in any one of Supplementary notes 1, 2 and 7, wherein the first control signal for activating the second D2D transmission mode is broadcasted or multicasted, on a channel to be received by a plurality of radio terminals, in a specific cell provided by the network apparatus.

(Supplementary Note 9)

The network apparatus described in any one of Supplementary notes 1 to 7, wherein the at least one processor is configured to transmit the first control signal for activating the second D2D transmission mode to the D2D transmitting terminal in response to receiving from the D2D transmitting terminal a request indicating that the second D2D transmission mode is required.

(Supplementary Note 10)

The network apparatus described in any one of Supplementary notes 1 to 7 and 9, wherein the at least one processor is configured to, in response to receiving from the D2D transmitting terminal a notification indicating that the second D2D transmission mode is not required, transmit to the D2D transmitting terminal a second control signal including an indication for triggering switching from the second D2D transmission mode to the first D2D transmission mode.

(Supplementary Note 11)

The network apparatus described in any one of Supplementary notes 1 to 7, wherein the at least one processor is configured to transmit the first control signal for activating the second D2D transmission mode to at least one of the D2D transmitting terminal and the D2D receiving terminal in response to receiving from an upper network a request indicating that the second D2D transmission mode is required.

(Supplementary Note 12)

The network apparatus described in any one of Supplementary notes 1 to 7 and 11, wherein the at least one processor is configured to, in response to receiving from an upper network a notification indicating that the second D2D transmission mode is not required, transmit to at least one of the D2D transmitting terminal and the D2D receiving terminal a second control signal including an indication for triggering switching from the second D2D transmission mode to the first D2D transmission mode.

(Supplementary Note 13)

The network apparatus described in any one of Supplementary notes 1 to 7, wherein the at least one processor is configured to, in response to autonomously determining that the second D2D transmission mode is required, transmit the first control signal for activating the second D2D transmission mode to at least one of the D2D transmitting terminal and the D2D receiving terminal.

(Supplementary Note 14)

The network apparatus described in any one of Supplementary notes 1 to 7 and 13, wherein the at least one processor is configured to, in response to autonomously determining that the second D2D transmission mode is not required, transmit to at least one of the D2D transmitting terminal and the D2D receiving terminal a second control signal including an indication for triggering switching from the second D2D transmission mode to the first D2D transmission mode.

(Supplementary Note 15)

The network apparatus described in any one of Supplementary notes 1 to 7, wherein the at least one processor is configured to determine, based on a delay required for D2D communication between the D2D transmitting terminal and the D2D receiving terminal, whether or not the second D2D transmission mode is to be activated for the D2D communication.

(Supplementary Note 16)

The network apparatus described in any one of Supplementary notes 1 to 15, wherein the at least one processor is configured to, when the second D2D transmission mode is activated for specific D2D communication between the D2D transmitting terminal and the D2D receiving terminal, transmit to another D2D terminal a control message indicating that communication in accordance with the second D2D transmission mode is being performed in a vicinity.

(Supplementary Note 17)

The network apparatus described in Supplementary note 16, wherein the control message indicates that the other D2D terminal is prohibited from using a radio resource used for the specific D2D communication.

(Supplementary Note 18)

The network apparatus described in any one of Supplementary notes 1 to 17, wherein the at least one processor is configured to transmit the first control signal to a D2D terminal group including at least three terminals including the D2D transmitting terminal, the D2D receiving terminal, and another D2D terminal.

(Supplementary Note 19)

A method performed by a network apparatus, the method comprising transmitting, to at least one of a D2D transmitting terminal and a D2D reception terminal, a first control signal including an indication indicating which of first and second device-to-device (D2D) transmission modes is to be activated, wherein the first D2D transmission mode conforms to a first resource pattern that is repeated every first time period, each first resource pattern includes: a control channel subframe pool used to transmit, from the D2D transmitting terminal to the D2D receiving terminal, first D2D control information indicating resource allocation for data transmission; and a data channel subframe pool used for data transmission from the D2D transmitting terminal to the D2D receiving terminal in accordance with the first D2D control information, the second D2D transmission mode conforms to a second resource pattern that is repeated every second time period, the second time period being the same as or different from the first time period, each second resource pattern includes a data channel subframe pool used for data transmission from the D2D transmitting terminal to the D2D receiving terminal, and each second resource pattern is defined so that:

(a) within one second resource pattern or two adjacent second resource patterns, a plurality of control channel subframe pools used for transmission of the first D2D control information appear at an interval shorter than the first time period;

(b) each second resource pattern includes a control channel subframe pool used to transmit second D2D control information indicating resource allocation for data transmission performed in a plurality of consecutive second time periods; or (c) each second resource pattern does not include a control channel subframe pool used for transmission of the first or second D2D control information.

(Supplementary Note 20)

A non-transitory computer-readable medium storing a program for causing a computer to perform a method in a network apparatus, wherein the method comprises transmitting, to at least one of a D2D transmitting terminal and a D2D reception terminal, a first control signal including an indication indicating which of first and second device-to-device (D2D) transmission modes is to be activated, the first D2D transmission mode conforms to a first resource pattern that is repeated every first time period, each first resource pattern includes: at least one control channel subframe pool used to transmit, from the D2D transmitting terminal to the D2D receiving terminal, first D2D control information indicating resource allocation for data transmission; and a data channel subframe pool used for data transmission from the D2D transmitting terminal to the D2D receiving terminal in accordance with the first D2D control information, the second D2D transmission mode conforms to a second resource pattern that is repeated every second time period, the second time period being the same as or different from the first time period, each second resource pattern includes a data channel subframe pool used for data transmission from the D2D transmitting terminal to the D2D receiving terminal, and each second resource pattern is defined so that:

(a) within one second resource pattern or two adjacent second resource patterns, a plurality of control channel subframe pools used for transmission of the first D2D control information appear at an interval shorter than the first time period;

(b) each second resource pattern includes a control channel subframe pool used to transmit second D2D control information indicating resource allocation for data transmission performed in a plurality of consecutive second time periods; or (c) each second resource pattern does not include a control channel subframe pool used for transmission of the first or second D2D control information.

(Supplementary Note 21)

A radio terminal comprising:

a memory; and at least one processor, wherein the at least one processor is configured to receive a first control signal including an indication indicating which of first and second device-to-device (D2D) transmission modes is to be activated, and upon receiving the first control signal, perform D2D communication in accordance with the second D2D transmission mode, the first D2D transmission mode conforms to a first resource pattern that is repeated every first time period, each first resource pattern includes: a control channel subframe pool used to transmit, from a D2D transmitting terminal to a D2D receiving terminal, first D2D control information indicating resource allocation for data transmission; and a data channel subframe pool used for data transmission from the D2D transmitting terminal to the D2D receiving terminal in accordance with the first D2D control information, the second D2D transmission mode conforms to a second resource pattern that is repeated every second time period, the second time period being the same as or different from the first time period, each second resource pattern includes a data channel subframe pool used for data transmission from the D2D transmitting terminal to the D2D receiving terminal, and each second resource pattern is defined so that:

(a) within one second resource pattern or two adjacent second resource patterns, a plurality of control channel subframe pools used for transmission of the first D2D control information appear at an interval shorter than the first time period;

(b) each second resource pattern includes a control channel subframe pool used to transmit second D2D control information indicating resource allocation for data transmission performed in a plurality of consecutive second time periods; or (c) each second resource pattern does not include a control channel subframe pool used for transmission of the first or second D2D control information.

(Supplementary Note 22)

The radio terminal described in Supplementary note 21, wherein the at least one processor is configured to, when the second D2D transmission mode is activated, receive, from a network apparatus, persistent resource allocation that is valid over a plurality of second resource patterns.

(Supplementary Note 23)

The radio terminal described in Supplementary note 22, wherein the first control signal for activating the second D2D transmission mode is a D2D grant message including both the indication and the persistent resource allocation.

(Supplementary Note 24)

The radio terminal described in Supplementary note 23, wherein the radio terminal is the D2D transmitting terminal, and the at least one processor is configured to transmit the second D2D control information to the D2D receiving terminal in response to receiving the D2D grant message.

(Supplementary Note 25)

The radio terminal described in Supplementary note 22, wherein the first control signal for activating the second D2D transmission mode is a Radio Resource Control (RRC) message including both the indication and the persistent resource allocation.

(Supplementary Note 26)

The radio terminal described in any one of Supplementary notes 22, 23 and 25, wherein each second resource pattern does not include the control channel subframe pool.

(Supplementary Note 27)

The radio terminal described in Supplementary note 21, wherein the second time period is shorter than the first time period.

(Supplementary Note 28)

The radio terminal described in any one of Supplementary notes 21 to 27, wherein the first control signal for activating the second D2D transmission mode indicates deactivation of the first time period or the first resource pattern.

(Supplementary Note 29)

The radio terminal described in any one of Supplementary notes 21 to 28, wherein the at least one processor is configured to transmit a control message indicating activation of the second D2D transmission mode to another D2D terminal in response to receiving the first control signal for activating the second D2D transmission mode.

(Supplementary Note 30)

A method performed by a radio terminal comprising:

receiving a first control signal including an indication indicating which of first and second device-to-device (D2D) transmission modes is to be activated; and upon receiving the first control signal, performing D2D communication in accordance with the second D2D transmission mode, wherein the first D2D transmission mode conforms to a first resource pattern that is repeated every first time period, each first resource pattern includes: a control channel subframe pool used to transmit, from a D2D transmitting terminal to a D2D receiving terminal, first D2D control information indicating resource allocation for data transmission; and a data channel subframe pool used for data transmission from the D2D transmitting terminal to the D2D receiving terminal in accordance with the first D2D control information, the second D2D transmission mode conforms to a second resource pattern that is repeated every second time period, the second time period being the same as or different from the first time period, each second resource pattern includes a data channel subframe pool used for data transmission from the D2D transmitting terminal to the D2D receiving terminal, and each second resource pattern is defined so that:

(a) within one second resource pattern or two adjacent second resource patterns, a plurality of control channel subframe pools used for transmission of the first D2D control information appear at an interval shorter than the first time period;

(b) each second resource pattern includes a control channel subframe pool used to transmit second D2D control information indicating resource allocation for data transmission performed in a plurality of consecutive second time periods; or (c) each second resource pattern does not include a control channel subframe pool used for transmission of the first or second D2D control information.

(Supplementary Note 31)

A non-transitory computer-readable medium storing a program for causing a computer to perform a method in a radio terminal, the method comprising:

receiving a first control signal including an indication indicating which of first and second device-to-device (D2D) transmission modes is to be activated; and upon receiving the first control signal, performing D2D communication in accordance with the second D2D transmission mode, wherein the first D2D transmission mode conforms to a first resource pattern that is repeated every first time period, each first resource pattern includes: a control channel subframe pool used to transmit, from a D2D transmitting terminal to a D2D receiving terminal, first D2D control information indicating resource allocation for data transmission; and a data channel subframe pool used for data transmission from the D2D transmitting terminal to the D2D receiving terminal in accordance with the first D2D control information, the second D2D transmission mode conforms to a second resource pattern that is repeated every second time period, the second time period being the same as or different from the first time period, each second resource pattern includes a data channel subframe pool used for data transmission from the D2D transmitting terminal to the D2D receiving terminal, and each second resource pattern is defined so that:

(a) within one second resource pattern or two adjacent second resource patterns, a plurality of control channel subframe pools used for transmission of the first D2D control information appear at an interval shorter than the first time period;

(b) each second resource pattern includes a control channel subframe pool used to transmit second D2D control information indicating resource allocation for data transmission performed in a plurality of consecutive second time periods; or (c) each second resource pattern does not include a control channel subframe pool used for transmission of the first or second D2D control information.

REFERENCE SIGNS LIST

1 UE
2 eNB
3 UPPER NETWORK
1901 RADIO FREQUENCY (RF) TRANSCEIVER
1903 BASEBAND PROCESSOR
1904 APPLICATION PROCESSOR
1906 MEMORY
2001 RF TRANSCEIVER
2004 PROCESSOR
2005 MEMORY

The invention claimed is:

1. A network apparatus comprising:
a memory; and
at least one processor, wherein
the at least one processor is configured to transmit, to at least one of a D2D transmitting terminal and a D2D reception terminal, a first control signal including an indication indicating which of first and second device-to-device (D2D) transmission modes is to be activated,
the first D2D transmission mode conforms to a first resource pattern that is repeated every first time period,
each first resource pattern includes: a control channel subframe pool used to transmit, from the D2D transmitting terminal to the D2D receiving terminal, first D2D control information indicating resource allocation for data transmission; and a data channel subframe pool used for data transmission from the D2D transmitting terminal to the D2D receiving terminal in accordance with the first D2D control information, the second D2D transmission mode conforms to a second resource pattern that is repeated every second time period, the second time period being the same as or different from the first time period, each second resource pattern includes a data channel subframe pool used for data transmission from the D2D transmitting terminal to the D2D receiving terminal, and each second resource pattern is defined so that:

(a) within one second resource pattern or two adjacent second resource patterns, a plurality of control channel subframe pools used for transmission of the first D2D control information appear at an interval shorter than the first time period;

(b) each second resource pattern includes a control channel subframe pool used to transmit second D2D control information indicating resource allocation for data transmission performed in a plurality of consecutive second time periods; or (c) each second resource pattern does not include a control channel subframe pool used for transmission of the first or second D2D control information.

2. The network apparatus according to claim 1, wherein the at least one processor is configured to, when the second D2D transmission mode is activated, notify at least one of the D2D transmitting terminal and the D2D receiving terminal of persistent resource allocation that is valid over a plurality of second resource patterns.

3. The network apparatus according to claim 2, wherein the first control signal for activating the second D2D transmission mode is a D2D grant message including both the indication and the persistent resource allocation, and the at least one processor is configured to transmit the D2D grant message to the D2D transmitting terminal.

4. The network apparatus according to claim 2, wherein the first control signal for activating the second D2D transmission mode is a Radio Resource Control (RRC) message including both the indication and the persistent resource allocation, and the at least one processor is configured to transmit the RRC message to the D2D transmitting terminal and the D2D receiving terminal.

5. The network apparatus according to claim 2, wherein each second resource pattern does not include the control channel subframe pool.

6. The network apparatus according to claim 1, wherein the second time period is shorter than the first time period.

7. The network apparatus according to claim 1, wherein the first control signal for activating the second D2D transmission mode indicates deactivation of the first time period or the first resource pattern.

8. The network apparatus according to claim 1, wherein the first control signal for activating the second D2D transmission mode is broadcasted or multicasted, on a channel to be received by a plurality of radio terminals, in a specific cell provided by the network apparatus.

9. The network apparatus according to claim 1, wherein the at least one processor is configured to transmit the first control signal for activating the second D2D transmission mode to the D2D transmitting terminal in response to receiving from the D2D transmitting terminal a request indicating that the second D2D transmission mode is required.

10. The network apparatus according to claim 1, wherein the at least one processor is configured to, in response to receiving from the D2D transmitting terminal a notification indicating that the second D2D transmission mode is not required, transmit to the D2D transmitting terminal a second control signal including an indication for triggering switching from the second D2D transmission mode to the first D2D transmission mode.

11. The network apparatus according to claim 1, wherein the at least one processor is configured to transmit the first control signal for activating the second D2D transmission mode to at least one of the D2D transmitting terminal and the D2D receiving terminal in response to receiving from an upper network a request indicating that the second D2D transmission mode is required.

12. The network apparatus according to claim 1, wherein the at least one processor is configured to, in response to receiving from an upper network a notification indicating that the second D2D transmission mode is not required, transmit to at least one of the D2D transmitting terminal and the D2D receiving terminal a second control signal including an indication for triggering switching from the second D2D transmission mode to the first D2D transmission mode.

13. The network apparatus according to claim 1, wherein the at least one processor is configured to, in response to autonomously determining that the second D2D transmission mode is required, transmit the first control signal for activating the second D2D transmission mode to at least one of the D2D transmitting terminal and the D2D receiving terminal.

14. The network apparatus according to claim 1, wherein the at least one processor is configured to, in response to autonomously determining that the second D2D transmission mode is not required, transmit to at least one of the D2D transmitting terminal and the D2D receiving terminal a second control signal including an indication for triggering switching from the second D2D transmission mode to the first D2D transmission mode.

15. The network apparatus according to claim 1, wherein the at least one processor is configured to determine, based on a delay required for D2D communication between the D2D transmitting terminal and the D2D receiving terminal, whether or not the second D2D transmission mode is to be activated for the D2D communication.

16. The network apparatus according to claim 1, wherein the at least one processor is configured to, when the second D2D transmission mode is activated for specific D2D communication between the D2D transmitting terminal and the D2D receiving terminal, transmit to another D2D terminal a control message indicating that communication in accordance with the second D2D transmission mode is being performed in a vicinity.

17. The network apparatus according to claim 16, wherein the control message indicates that the other D2D terminal is prohibited from using a radio resource used for the specific D2D communication.

18. The network apparatus according to claim 1, wherein the at least one processor is configured to transmit the first control signal to a D2D terminal group including at least three terminals including the D2D transmitting terminal, the D2D receiving terminal, and another D2D terminal.

19. A method performed by a network apparatus, the method comprising transmitting, to at least one of a D2D transmitting terminal and a D2D reception terminal, a first control signal including an indication indicating which of first and second device-to-device (D2D) transmission modes is to be activated, wherein the first D2D transmission mode conforms to a first resource pattern that is repeated every first time period, each first resource pattern includes: a control channel subframe pool used to transmit, from the D2D transmitting terminal to the D2D receiving terminal, first D2D control information indicating resource allocation for data transmission; and a data channel subframe pool used for data transmission from the D2D transmitting terminal to the D2D receiving terminal in accordance with the first D2D control information, the second D2D transmission mode conforms to a second resource pattern that is repeated every second time period, the second time period being the same as or different from the first time period, each second resource pattern includes a data channel subframe pool used for data transmission from the D2D transmitting terminal to the D2D receiving terminal, and each second resource pattern is defined so that:

(a) within one second resource pattern or two adjacent second resource patterns, a plurality of control channel subframe pools used for transmission of the first D2D control information appear at an interval shorter than the first time period;

(b) each second resource pattern includes a control channel subframe pool used to transmit second D2D control information indicating resource allocation for data transmission performed in a plurality of consecutive second time periods; or (c) each second resource pattern does not include a control channel subframe pool used for transmission of the first or second D2D control information.

20. A radio terminal comprising:

a memory; and at least one processor, wherein the at least one processor is configured to receive a first control signal including an indication indicating which of first and second device-to-device (D2D) transmission modes is to be activated, and upon receiving the first control signal, perform D2D communication in accordance with the second D2D transmission mode, the first D2D transmission mode conforms to a first resource pattern that is repeated every first time period, each first resource pattern includes: a control channel subframe pool used to transmit, from a D2D transmitting terminal to a D2D receiving terminal, first D2D control information indicating resource allocation for data transmission; and a data channel subframe pool used for data transmission from the D2D transmitting terminal to the D2D receiving terminal in accordance with the first D2D control information, the second D2D transmission mode conforms to a second resource pattern that is repeated every second time period, the second time period being the same as or different from the first time period, each second resource pattern includes a data channel subframe pool used for data transmission from the D2D transmitting terminal to the D2D receiving terminal, and each second resource pattern is defined so that:

(a) within one second resource pattern or two adjacent second resource patterns, a plurality of control channel subframe pools used for transmission of the first D2D control information appear at an interval shorter than the first time period;

(b) each second resource pattern includes a control channel subframe pool used to transmit second D2D control information indicating resource allocation for data transmission performed in a plurality of consecutive second time periods; or (c) each second resource pattern does not include a control channel subframe pool used for transmission of the first or second D2D control information.

* * * * *

UNITED STATES PATENT AND TRADEMARK OFFICE
CERTIFICATE OF CORRECTION

PATENT NO. : 10,524,235 B2
APPLICATION NO. : 16/072205
DATED : December 31, 2019
INVENTOR(S) : Taichi Ohtsuji, Hiroaki Aminaka and Kazushi Muraoka Page 1 of 1

It is certified that error appears in the above-identified patent and that said Letters Patent is hereby corrected as shown below:

In the Specification

Column 2, Background Art, Line 62: Delete "RRC IDLE." and insert --RRC_IDLE.-- therefor Column 3, Background Art, Line 65: Delete "$m^{PSCCH\_RP}_{RB}$" and insert --$M^{PSCCH\_RP}_{RB}$-- therefor Column 4, Background Art, Line 52: Delete "$l^{PSCCH}_{PSCCH-}+1$" and insert --$l^{PSCCH}_{PSCCH-1}+1$-- therefor Column 4, Background Art, Line 64: Delete "$j_{begin}O_2$" and insert --$j_{begin}+O_2$-- therefor Column 5, Background Art, Line 10: Delete "$a_0, a_1, a_2, a_{N\_B-1}$" and insert --$a_0, a_1, a_2, ..., a_{N\_B-1}$-- therefor Signed and Sealed this
Fifth Day of May, 2020

Andrei Iancu
*Director of the United States Patent and Trademark Office*